United States Patent [19]

Nishimura et al.

[11] 4,263,601

[45] Apr. 21, 1981

[54] IMAGE FORMING PROCESS

[75] Inventors: Yukuo Nishimura, Sagamihara; Masahiro Haruta, Funabashi; Yasushi Takatori, Machida; Katsuhiko Nishide, Yokohama, all of Japan

[73] Assignee: Canon Kabushiki Kaisha, Tokyo, Japan

[21] Appl. No.: 945,533

[22] Filed: Sep. 25, 1978

[30] Foreign Application Priority Data

| | | | |
|---|---|---|---|
| Oct. 1, 1977 | [JP] | Japan | 52-118485 |
| Oct. 1, 1977 | [JP] | Japan | 52-118486 |
| Oct. 1, 1977 | [JP] | Japan | 52-118487 |
| Oct. 1, 1977 | [JP] | Japan | 52-118488 |
| Jan. 18, 1978 | [JP] | Japan | 53-3815 |
| Feb. 13, 1978 | [JP] | Japan | 53-15174 |

[51] Int. Cl.[3] .......... G01D 15/16

[52] U.S. Cl. .......... 346/1.1; 101/DIG. 13; 346/140 R

[58] Field of Search .......... 346/1.1, 140 R, 159; 101/DIG. 13, 114, 129, 127, 426; 400/119

[56] References Cited

U.S. PATENT DOCUMENTS

| | | | |
|---|---|---|---|
| 3,060,429 | 10/1962 | Winston | 346/1 |
| 3,247,825 | 4/1966 | Johnson | 101/DIG. 13 |
| 3,653,063 | 3/1972 | Miyazaki | 346/159 |
| 3,801,315 | 4/1974 | Gundlach | 101/DIG. 13 |
| 3,809,556 | 5/1974 | Pressman | 101/DIG. 13 |
| 3,884,684 | 5/1975 | Ohno | 101/DIG. 13 |
| 3,898,674 | 8/1975 | Koch | 346/155 |
| 4,166,277 | 8/1979 | Cielo | 346/140 R |

*Primary Examiner*—Joseph W. Hartary
*Attorney, Agent, or Firm*—Fitzpatrick, Cella, Harper & Scinto

[57] ABSTRACT

The present invention relates to an image forming process and an apparatus therefor for forming an image with liquid ink in response to output information from a facsimile or a computer, or optical information.

In the present invention there is employed a screen member provided with a plurality of through holes and control electrodes respectively provided in the vicinity of said through holes, and voltages corresponding to the image information signals are applied to said control electrodes to selectively introduce electroconductive liquid ink into said through holes thereby forming an image, said image then being transferred onto or made to fly toward a recording material such as paper.

7 Claims, 42 Drawing Figures

IMAGE FORMING PROCESS

BACKGROUND OF THE INVENTION

1. Field of the Invention

The present invention relates to an image forming process and apparatus therefor for forming an image with liquid ink in response to output information from a facsimile or a computer or optical information.

2. Description of the Prior Art

Image forming processes with liquid ink have been widely utilized particularly in the field of data processing for realizing noiseless, vibration-free printing devices. In a typical process ink drops are successively emitted toward a recording material, and the flight of said ink drops is controlled according to the information signals so as to deflect, during said flight, the unnecessary ink drops from the movement toward the recording material thereby forming an image corresponding to the information signals. In such process, however, ink drops flying across a very small distance have to be controlled during a very short period of flight, and the precision of image formation is inevitably limited as an exact control according to the information signals is difficult to achieve. Also there is required a circulation mechanism for recovering and reusing the thus deflected ink drops, which inevitably enlarges the dimension of the apparatus.

In an another image forming process plural ink supply holes or nozzles are provided in front of a recording material behind which independent pin electrodes are provided respectively corresponding to said nozzles and high-voltage pulses corresponding to the information signals are selectively applied between the nozzles and pin electrodes to cause flight of liquid ink thereby forming an image. This process provides an improved image precision as the information signals can be exactly applied to each nozzle. Also the apparatus can be made compact as the unnecessary ink drops are not created instead of being deflected during the flight, so that the circulation of ink drops is unnecessary. For improving the precision of image formation, however, it is necessary to maintain exact alignment between the nozzles and pin electrodes, and said alignment is very difficult to achieve in the structure of the apparatus as said nozzles and pin electrodes are both very small. Even a slight positional aberration between the two will result in a deterioration in the image precision. Also the pin electrodes receiving high-voltage pulses inevitably result in mutual interaction between the neighboring electrodes when they are arranged in a high density. For this reason it is impossible to obtain a high resolution in this process.

SUMMARY OF THE INVENTION

The object of the present invention is to provide an image forming process enabling a low-voltage control of image formation thereby allowing making it possible to provide an image of a high resolution and eliminating cumbersome operation of alignment between the nozzles and the pin electrodes.

Another object of the present invention is to provide an image forming process allowing a simplified structure of the apparatus as different through holes can receive supply of ink from the same liquid ink layer.

Still another object of the present invention is to provide an image forming process wherein the control of electrodes can be significantly simplified by the use of line-shaped electrodes.

Still another object of the present invention is to provide an image forming process capable of stable control of image formation without the influence of ink stain on the control electrodes or of changes in physical properties of ink by continuously applying a bias potential to the control electrode.

Still another object of the present invention is to provide an image forming apparatus wherein the flow rate of liquid can be stably controlled by the use of a deceleration control electrode.

Still another object of the present invention is to provide an image forming apparatus wherein the erosion of control electrode by the ink and the deterioration of electrode function resulting from ink deposition can be significantly reduced by the use of a water-repellent insulating coating provided on the surface of control electrode.

DETAILED DESCRIPTION OF THE PREFERRED EMBODIMENTS

Figure 1:
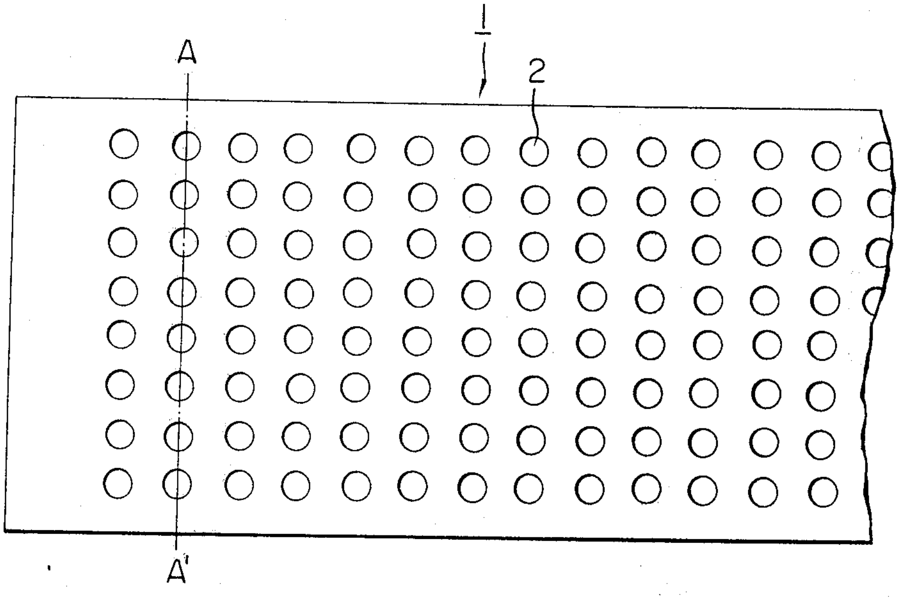
FIG. 1 is a plan view of a screen member.
Figure 2:
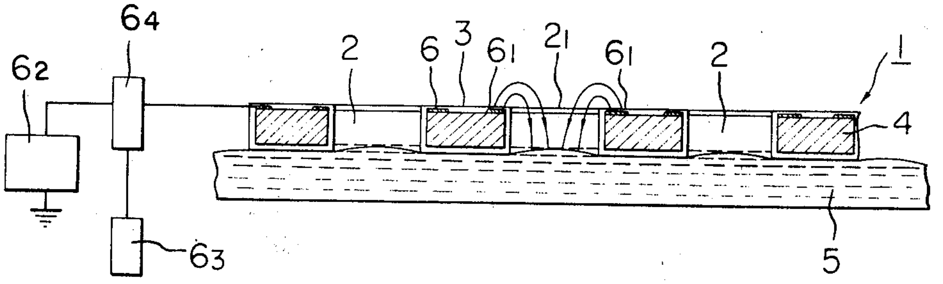
FIG. 2 is a cross-sectional view thereof.

Now the present invention will be explained in detail by the various embodiments thereof shown in the attached drawings. Referring to FIG. 1 showing an example of a screen member to be employed in the present invention in a plan view and FIG. 2 showing said member in a cross section along the line A-A′ in FIG. 1, the screen member 1 is provided with a number of capillary through holes 2 and its surface is covered with an ink-repellent layer 3 composed of a water-repellentinsulating material such as tetrafluoroethylene. The substrate 4 of said screen member is composed of a water-repellent insulating material such as polyimide, polyester or polyethylene. An electroconductive liquid ink 5 is maintained in contact with the screen member. 6 is a control electrode provided around each through hole 2. Although the screen member shown in FIG. 1 is provided with the water-repellent insulating coating on the entire surface thereof, such coating may be limited to the area coming into contact with the ink.

According to the present invention a pulse voltage is applied only to the selected control electrodes by electric signals corresponding to an image information, whereby ink is filled into thus selected through holes to form an image in the screen member corresponding to said image information. Said ink filling is caused by the electrostatic attractive force of the electric field generated by the application of said pulse voltage to the control electrode. The arrows shown in FIG. 2 represent the direction of lines of electric force by such pulse voltage applied to a selected control electrode $6_1$, and the resulting attractive force causes the ink to be sucked and filled into the through hole. The ink, being repelled by the ink-repellent layer 3, does not enter the through holes of which control electrodes do not receive the pulse voltage.

In the present embodiment the control electrode is provided either on the upper end surface of a through hole or inside the through hole in an upper end portion thereof and in contact wih the screen member, whereby it is rendered possible to eliminate cumbersome conventinal alignment between the nozzles and the pin electrodes. Besides, the present embodiment permits simplification of the structure as the ink supply to different through holes can be made from the same liquid ink layer, and to extend the service life of the control electrode, as he ink-repellent coating thereon not only prevents erosion of the electrode by the ink but also prevents deterioration of the electrode function resulting from ink deposition.

The pulse voltage supply to the control electrode is achieved by the voltage supplied from a bias voltage source $6_2$ and simultaneously by the information signal supplied by a signal source $6_3$, said voltage and signal being converted into pulses in a pulse converter $6_4$ to perform control according to the image.

Figure 3:
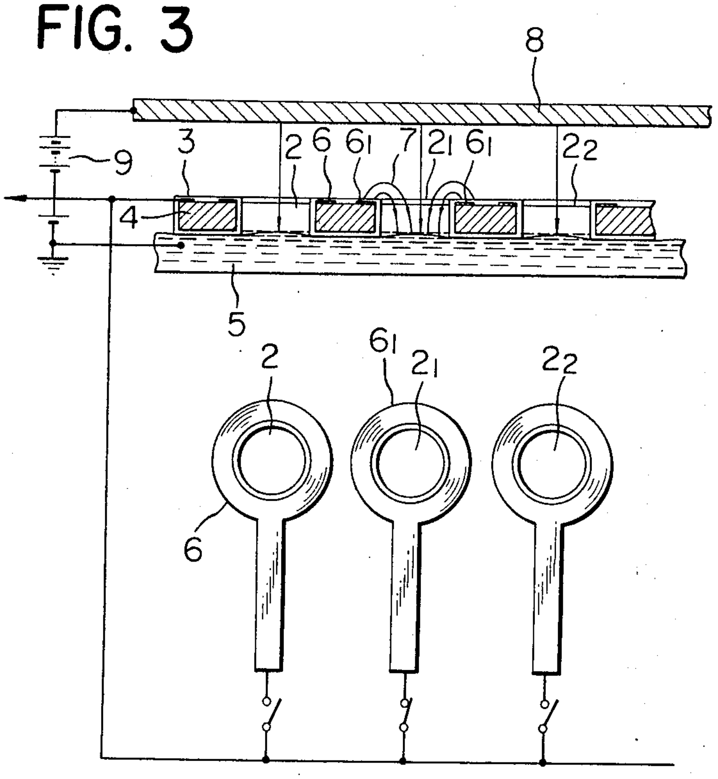
FIG. 3 is a cross-sectional view explaining the principles of the present invention.
Figure 4:
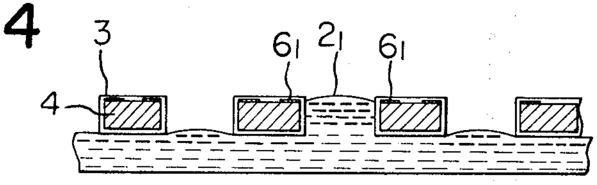
FIG. 4 is a cross-sectional view showin a state wherein the screen member is filled with liquid ink according to the image information.

FIG. 3 shows an another embodiment of the present invention wherein the above-mentioned screen member 1 is maintained in contact with electroconductive ink 5 while there is provided a counter electrode 8 parallel to said screen member, a voltage being continuously applied by a voltage source 9 across said counter electrode 8 and the conductive ink 5 which is grounded. Said voltage, however, is selected at such a level as not to cause entry of the ink 5 into the through holes, and separately a pulse voltage generated by electric signals (not shown) corresponding to the image information is selectively applied to the control electrodes (electrode $6_1$ in FIG. 3) thereby causing the selected through holes to be filled with the ink. The ink filled into the through hole forms a meniscus slightly protruding from the through hole, as at 2, in FIG. 4, thereby forming an image on the screen member corresponding to the original image information. The ink does not spill from the through hole as the control electrode is provided around the periphery of the through hole in contact therewith and is supplid with the voltage for a determined period after the ink is filled into the through hole. Thus the present embodiment is featured in that a low voltage not causing entry of ink into the through holes is applied between the ink 5 and the counter electrode 8 while a pulse voltage is supplied to the control electrodes corresponding to the image information thereby causing the through holes to be filled with ink by means of cooperation of electrostatic attractive forces of said counter electrode and control electrode. The ink is prevented from spilling from the hole by means of the Coulomb force as the control electrode receives the voltage for a determined period even after the hole is filled with the ink. The ink, being repelled by the ink-repellent layer 3 covering the inner surface of the through holes, does not enter the holes of which control electrodes do not receive the pulse voltage, as shown in FIG. 4 wherein a control electrode $6_1$ provided around a through hole $2_1$ alone receives a pulse voltage to cause the ink filling only in thus selected hole $2_1$.

The arrows 7 in FIG. 3 represent the direction of lines of electric force caused by the control electrode and the counter electrode. Also in order that the electrostatic attractive force acting on the liquid ink exceeds the surface tension thereof, the electric field E generated in a through hole is required to satisfy an equation: $E \geqq 2(\alpha/\epsilon_o\epsilon_s R)^{\frac{1}{2}}$ wherein $\alpha$ is the surface tension coefficient of ink, $\epsilon_o$ is the dielectric constant in vacuum, $\epsilon_s$ is the relative dielectric constant of the medium, and R is the radius of the through hole.

The above-mentioned embodiment permits control with low voltage pulses as the introduction of ink into the holes is achieved by the cooperation of the counter electrode and control electrode. The use of low voltage pulses improves the pulse compliance determined by the product of a capacitance and a resistance, thus enabling the use of high-speed pulses and significantly improving the compliance of image formation. Also in case of control with low-voltage pulses the electrodes can be arranged in a high density for obtaining an image of a high resolution in contrast to the control with high-voltage pulses wherein the electrodes cannot be arranged in a high density as the interaction between the neighboring electrodes may deteriorate the image quality. Furthermore, in case of low-voltage pulses the apparatus can be made compact as it is possible to employ small transistors and integrated circuits for the circuitry.

Also it is confirmed experimentally that the ink, having once entered the through hole, does not flow out therefrom even after the electrostatic attractive force is interrupted, and this fact enables the transfer step to be explained in the following with reference to FIGS. 5 and 6. The pulse voltage application can be achieved in a similar manner as shown in FIG. 2 and it not, therefore, represented in FIG. 3.

Figure 5:
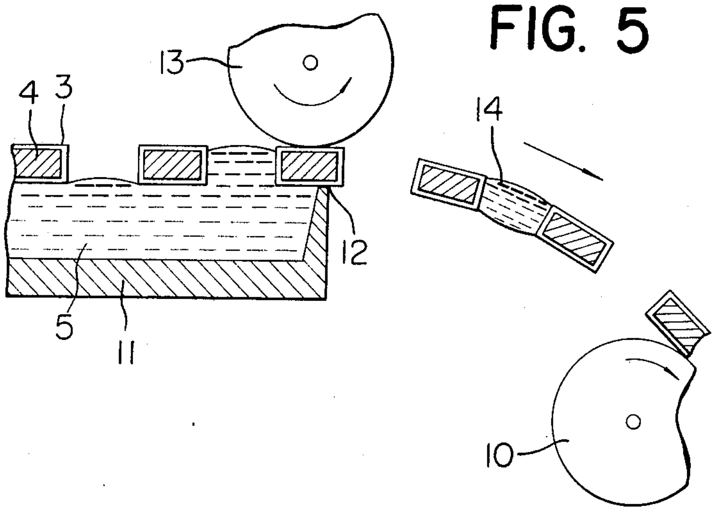
FIGS. 5 and 6 are schematic views of the apparatus embodying the present invention.

FIG. 5 shows a step of transferring the image formed on said screen member onto a printing medium. The screen member supporting the image thereon is formed endless and transported between two drive rollers, one such roller 10 being shown in FIG. 5. While being displaced the portion of screen member in contact with the ink layer 5 is gradually separated therefrom whereby the excessive ink present on the surface of screen member is removed by a doctor blade 12 constituting an end wall of an ink container 11 without extracting the ink filled in the through holes. It is experimentally confirmed that the ink present in the through holes is retained herein during the displacement even after the ink removal from the surface of the screen member. Consequently the ink drops 14 selectively filled in the through holes by the electric signals corresponding to the image information, and thus constituting the image on the screen member, are transported, by the displacement thereof, to a transfer position. A roller 13 is rotated in synchronization with the screen member to maintain the same in pressure contact with the doctor blade 12.

Figure 6:
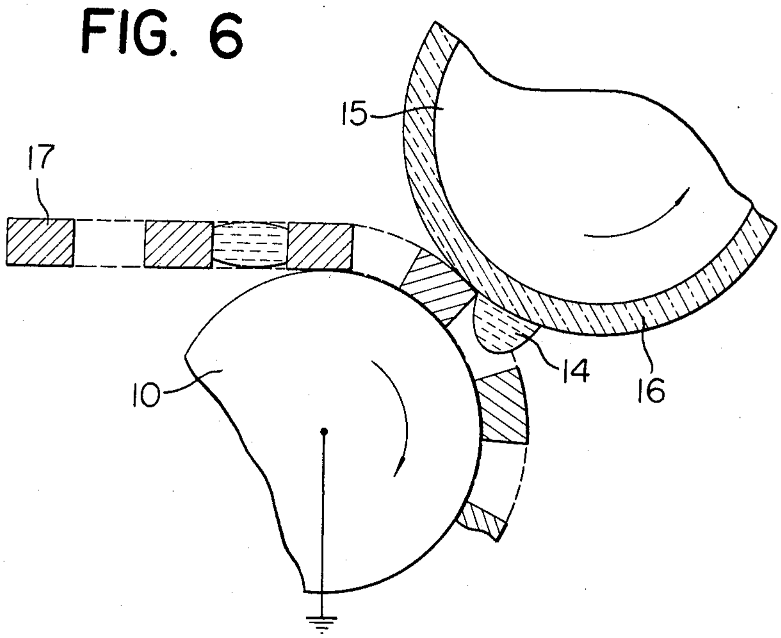

In a transfer step shown in FIG. 6, the screen member holding the image thereon is transported to a transfer position and brought into successive contact with a printing medium such as paper supported on a roller 15 thereby transferring the image onto said printing medium 16. In the present embodiment it is rendered possible to print even a complicated image while maintaining excellent clarity and resolution as the size of said ink drops can be easily modified by changing the diameter of the through holes. Also the transfer can be achieved more securely and more rapidly if a counter electrode is provided behind the printing medium 16 to electrostatically attract the ink drops contained in the through holes. Besides, the transfer can be achieved by bringing the printing medium 16 into contact with either surface of the screen member 17. Furthermore, the transfer can be further accelerated if the transfer is performed at the lower side of roller 10 as the displacement of ink drops to the printing medium 16 is facilitated by gravity.

Figure 7:
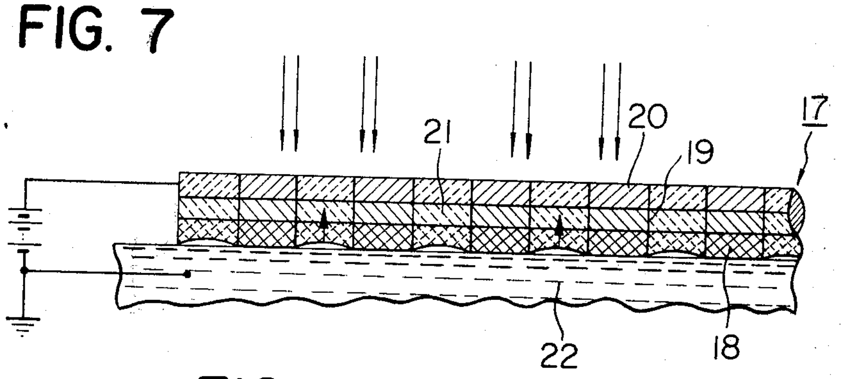
FIG. 7 is a cross-sectional view showing an another embodiment of the present invention.
Figure 8:
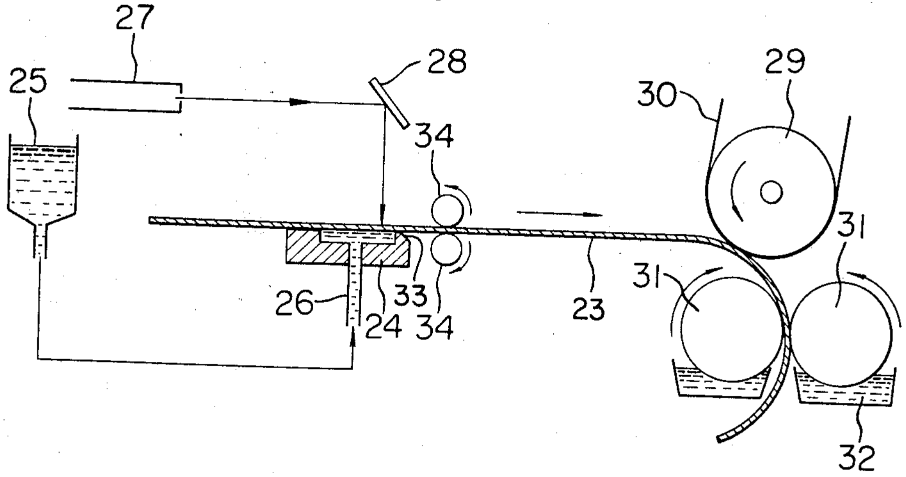
FIG. 8 is a schematic view of the apparatus of said embodiment.

FIGS. 7 and 8 show a still another embodiment of the present invention. Referring to FIG. 7 showing another embodiment of the screen member, an insulating film 18 is coated with a photoconductive layer 19 composed for example of selenium or cadmium sulfide and is further provided thereon with a conductive transparent layer for example a nesa glass layer 20. Said film is provided with capillary through holes 21 in a similar manner as in the foregoing embodiments, and is further provided, on the entire surface thereof, with a water-repellent insulating coating for example of tetrafluoroethylene. The screen member of the above-mentioned structure is maintained in contact, on the surface of insulating film 18 thereof, with a capillary layer 22 of liquid ink, and is selectively exposed to light (represented by arrows in the illustration) by the electric signals corresponding to the image information while a determined voltage is applied to said nesa glass layer 20. Thus the exposed portion of photoconductive layer 19 is rendered conductive. In this manner the electric field generated in the through hole from the photoconductive layer 19 thus rendered conductive is added to the electric field generated in the through hole by the voltage applied to said nesa glass layer 20 to enhance the entire electric field in said hole, thus permitting the ink to be drawn into the hole by a strong electrostatic force. Stated differently the function of the control electrode in the foregoing embodiment is performed, in the present embodiment, by the nesa glass layer and the photoconductive layer. This embodiment, therefore, allows control of the introduction of ink into the holes simply by turning on and off the light irradiation and is therefore capable of dispensing with the complicated wirings for controlling the control electrodes required in the foregoing embodiment. Also in this embodiment the ink enters only the through holes selected by the light irradiation because of the presence of the ink-repellent layer on the surface of screen member. The entire nesa glass layer is supplied uniformly with a determined voltage of such a magnitude that the electrostatic attractive force resulting from said voltage alone is insufficient for introducing the ink into the through holes. Thus the ink introduction is rendered possible only by the contribution of electrostatic force generated when the photoconductive layer 19 is rendered conductive by the selective light irradiation. Further, also in the present embodiment it is possible to control the nesa layer and the photoconductive layer with a low voltage by providing a counter electrode of a high voltage behind the screen member in a similar manner as in the foregoing embodiment, thereby avoiding the drawbacks associated with the high-voltage control and realizing the advantages explained in connection with the foregoing embodiment.

FIG. 8 schematically shows an apparatus employing the above mentioned screen member 23 of a structure as shown in FIG. 7 and formed in an endless belt, said screen member being rotated by a drive roller (not shown). The screen member, as shown in FIG. 7, is supplied with a voltage and is maintained in contact, on the surface of the insulating film, with a capillary layer container 24 in which the ink supplied from an ink tank 25 through a capillary tube 26 forms a thin layer contacting the screen member. On the upper surface said screen member receives, by way of a mirror 28, the light from a light source 27 controlled by electric signals corresponding to the image information. By the selective light irradiation the photoconductive layer is rendered conductive to contribute to the electrostatic force generated by the nesa layer thereby introducing the ink into the through holes corresponding to said image information. The ink drops thus introduced are retained in said holes and transported to a transfer roller 29 by the displacement of the screen member. On said transfer roller 29 there is provided a printing medium which is transported, by a known transporting means, in synchronization with the screen member 23. The printing medium thus transported, while an end thereof is attached on the transfer roller 29 by the cooperation of said roller 29 and the belt 30, is brought into contact with the screen member, whereby the ink drops maintained in the through holes forming a meniscus therein are successively transferred onto said printing medium, thus realizing the image transfer. After the transfer the screen member is cleaned by rollers 31 which are in turn washed by a washing liquid 32. A doctor blade 33 is provided for removing excessive ink from the surface of said screen member. Also there are provided rollers 34 for supporting the screen member therebetween and maintaining the same in exact contact with the thin ink layer present in the container 24. Furthermore it is possible to conduct the image transfer more securely by providing a counter electrode behind the printing medium in the transfer position in a similar manner as explained in the foregoing embodiment.

The present embodiment allows obtainment of a compact apparatus with significantly reduced troubles as the selective ink introduction into the through holes caused by selective light irradiation of the photoconductive layer permits one to dispense with the complicated wirings for the control electrodes.

FIGS. 9 to 13 show still another embodiment of the present invention which is featured in that the voltage applied to the counter electrode is higher than in the foregoing embodiment and is of a magnitude capable of causing the flight of ink drops introduced into the through holes, in contrast to the foregoing embodiment wherein the counter electrode is supplied with a lower voltage sufficient, in cooperation with the control electrode, for causing the through holes to be filled with the ink. Also the present embodiment is featured in that the voltage supply to the control electrodes is terminated before the ink reaches the upper end of the through holes thereby causing said ink flight whereas in the foregoing embodiment the voltage supply to the control electrodes is continued for a determined period even after the holes are filled with the ink.

Figure 9:
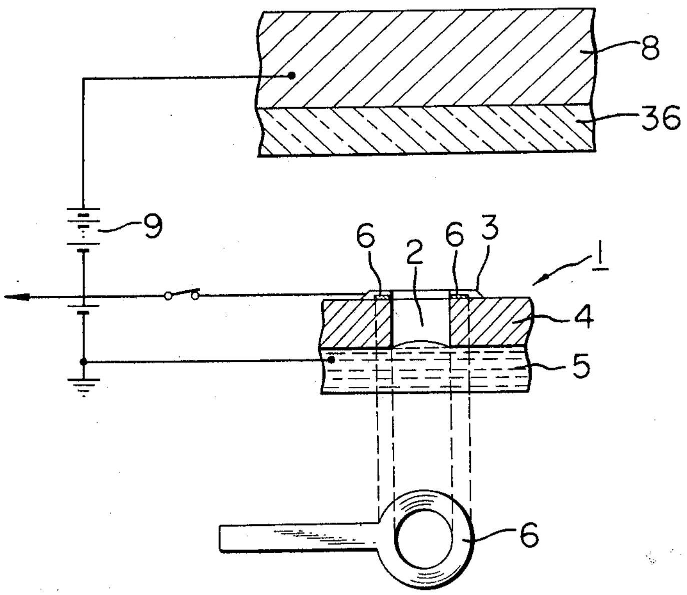
FIG. 9 is a cross-sectinal view showing the essential arrangement of the present invention.

FIG. 9 shows the arrangement of the present embodiment wherein the same components as in the foregoing embodiment are represented by the same numbers. Above the screen member 1 there is provided a printing medium 36 behind which is a counter electrode 8. Also under the screen member there is provided, in contact therewith, a conductive ink layer 5. A voltage source 9 applies a high voltage between the grounded ink layer 5 and the counter electrode 8. Said voltage, however, is selected so as not to cause the ink introduction into the through holes 2, which is only rendered possible when the control electrode receives a pulse voltage corresponding to the image information. Thus the ink introduction into the through holes 2 in the present embodiment is caused by the cooperation of electric fields generated by the counter electrode 8 and the control electrode 6.

Figure 10:
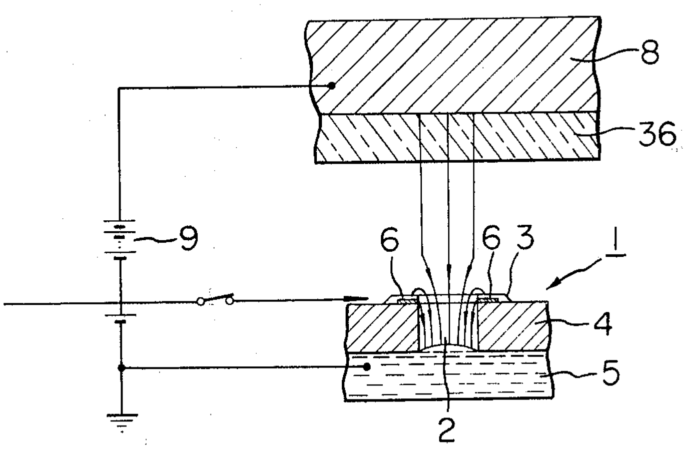
FIGS. 10, 11 and 12 are schematic views explaining the principles of the present invention.
Figure 11:
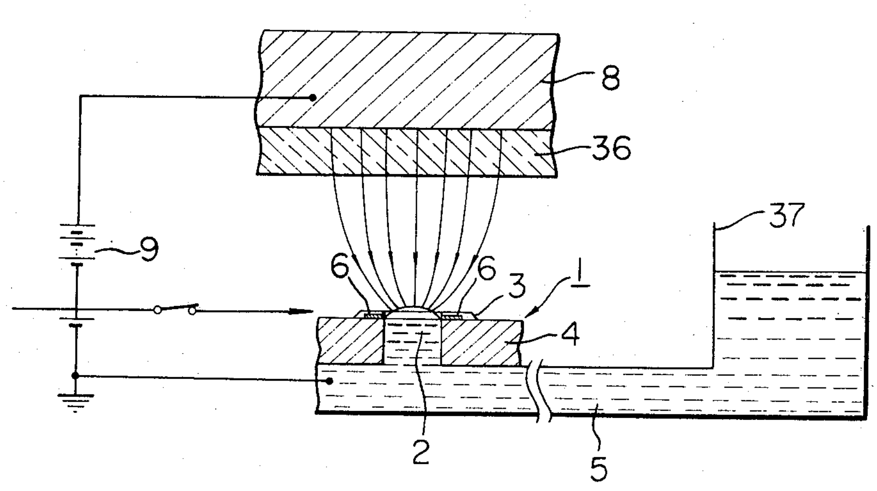
Figure 12:
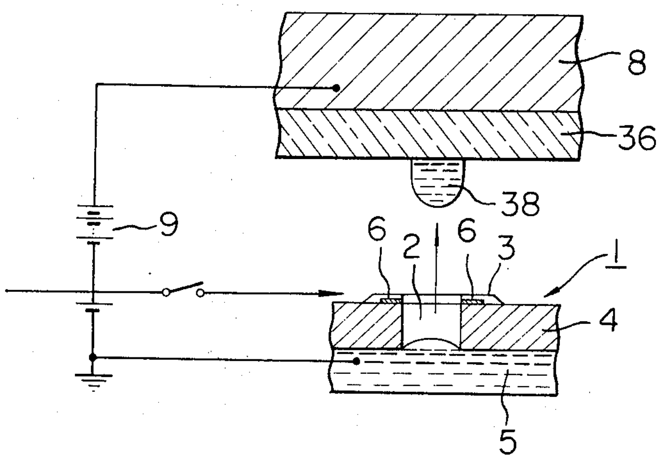
Figure 13:
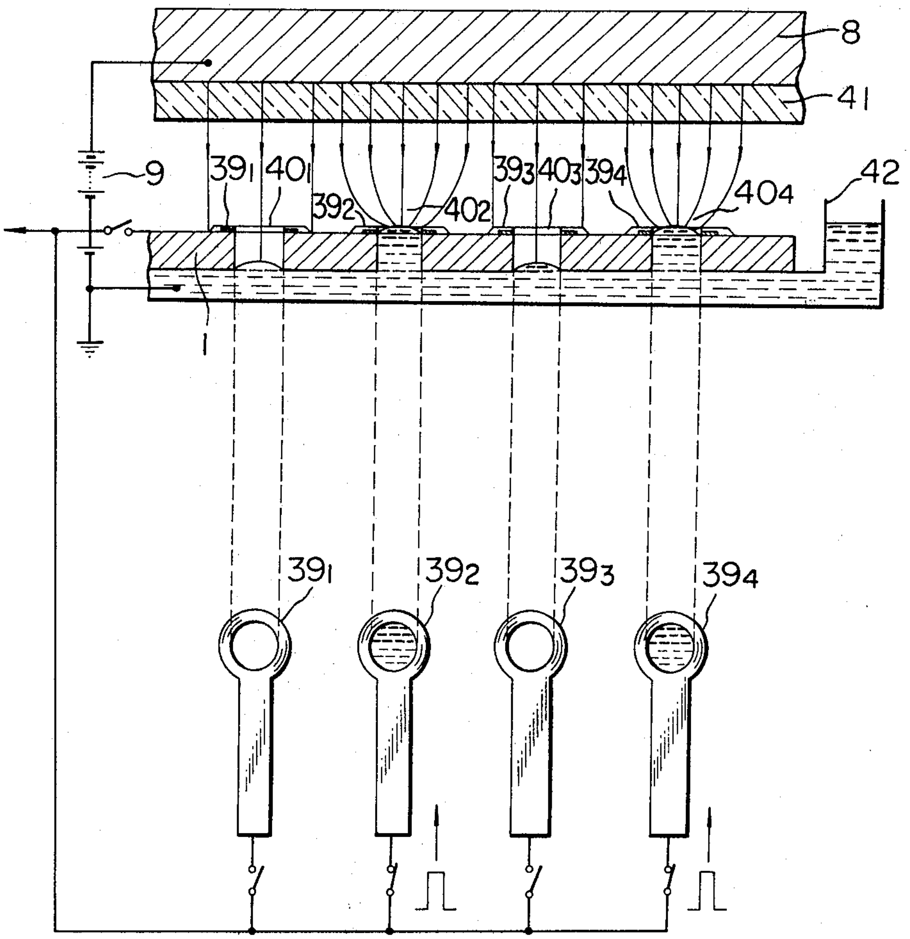
FIG. 13 is a cross-sectional view showing an embodiment of the present invention.
Figure 37:
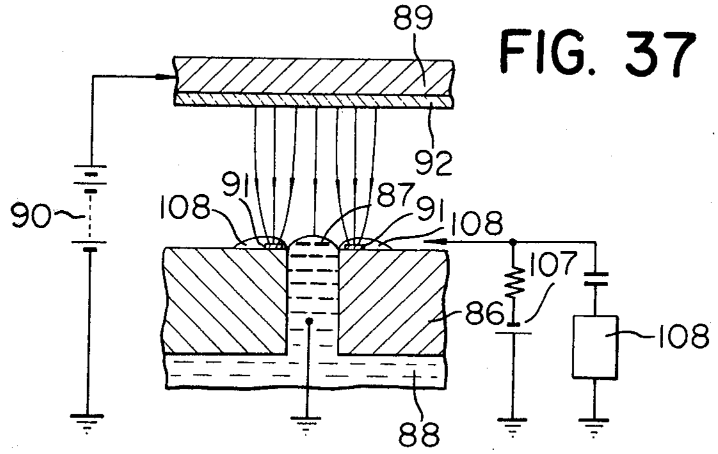
FIGS. 37 and 38 are schematic views showing a still another embodiment of the present invention.

FIG. 10 shows a state wherein a pulse voltage is applied to the control electrode 6 to generate an electric field therefrom, so that the through hole 2 receives said field as well as that generated by the counter electrode 8, to cause, by the electrostatic attractive force thereof, introduction of ink from the ink layer 5 into the hole 2. The ink thus introduced forms a meniscus and rises until it slightly protrudes from the control electrode 6 as shown in FIG. 11. In this state the electric field resulting from the counter electrode 8 is concentrated on the thus protruding end to generate an enhanced electrostatic attractive force though the voltage applied to said electrode remains constant thereby causing the flight of ink from the through hole. In this case the voltage supply to the control electrode is terminated at least before the ink reaches the upper end of said hole as to be explained later in connection with FIG. 24. In order to further enhance the concentration of electric field to said protruding portion of ink, the control electrode may be supplied in advance with a continuous bias voltage of a polarity identical with that of the pulse voltage, or said pulse voltage may be provided with a gentle slope at the trailing end. In this manner the flying ink is deposited on the printing medium 36 positioned in the flight path thereof. In this case the amount of ink passing through the hole can be easily controlled by regulating the voltage to be supplied to the control electrode. In the present embodiment, therefore it is possible to cause the ink flight from the through holes either in continuous state or in ink drops. It is further easily possible to regulate the size of flying ink drops. Also the voltage supplied to the counter electrode is arbitrarily changeable according to the amount of ink drops to be put into flight. In FIG. 11 37 is an ink tank preferably provided with an automatic feeding device for constantly storing a determined quantity of ink. FIG. 12 shows an embodiment wherein an ink drop 38 is caused to fly to the printing medium. Also in the present embodiment the turning on and off of voltage supply to the control electrode 6 are facilitated by applying pulse voltages thereto. The imagewise control of pulse application, though not shown in the drawing, is achieved in a similar manner as in the foregoing embodiment by supplying a bias voltage from a bias source and image signals corresponding to the image information from a signal source, said signals being converted into pulses in a pulse generator. FIG. 13 shows an example of screen member provided with plural through holes. In this example a polyimide film of 50 microns thick is provided with plural through holes of a diameter of 60 microns with a distance of 125 microns between the centers thereof. Around each hole there is provided an evaporated aluminum layer of a thickness of 1000 to 5000 A as a control electrode, the surface of which is coated with a water-repellent insulating layer of tetrafluoroethylene. In this embodiment the image formation on the printing medium is achieved by the ink flight exclusively from the selected through holes through the control of control electrodes corresponding to the image information. In the illustrated example the image formation on the printing medium 41 is achieved by ink flight from the through holes $\mathbf{40_2}$, $\mathbf{40_4}$ by applying a voltage of 30–200 V for a period of 100–200 microseconds. In this example the counter electrode is supplied with a voltage of 1–5 kV. The ink is naturally not introduced in the through holes of which control electrodes do not receive the above-mentioned voltage.

The present embodiment allows the use of a common ink reservoir 42 as shown in the drawing as the ink introduction up to the upper end of a particular through hole is controlled by the turning on and off of the voltage supply to the control electrode provided around each through hole. Thus the apparatus can be made very simple as it is not necessary to provide each through hole with a respective ink reservoir.

Furthermore, although the ink introduction into the through holes in the foregoing embodiments is achieved by the cooperation of the electric fields of the control electrode and of the counter electrode, it is also possible to achieve such ink introduction exclusively by the electric field of the control electrode.

FIGS. 14 to 21 show a still another embodiment utilizing linear electrodes each of which is independently controllable.

Figure 14:
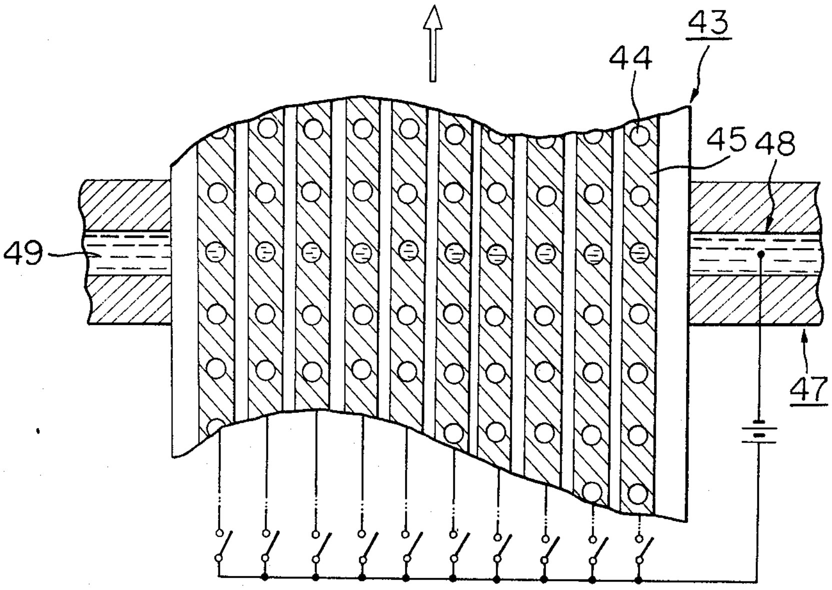
FIG. 14 is a plan view showing the arrangement in said embodiment.

Referring to FIG. 14 showing the arrangement of essential components in this embodiment, a screen member 43 is provided with plural through holes 44 arranged with a fixed distance therebetween. On the surface of said screen member there are provided parallel linear electrodes 45 encircling said through holes 44 and mutually separated, and the surface of which is covered with an ink-repellent layer composed for example of tetrafluoroethylene.

Figure 15:
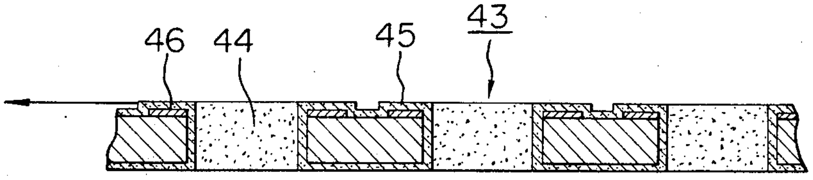
FIG. 15 is a cross-sectional view of the screen member.

FIG. 15 is an enlarged cross-sectional view of said screen member wherein 46 is the above-mentioned ink-repellent layer.

Said screen member 43 is maintained in the proximity of or in contact with ink supported in a capillary slot 48 provided in an ink supplier 47, said slot 48 being designed to constantly receive a determined quantity of ink for example by an automatic feeding device. Also each of said linear electrodes receives pulse voltages corresponding to the image information in a similar manner as in the foregoing embodiments.

Figure 16:
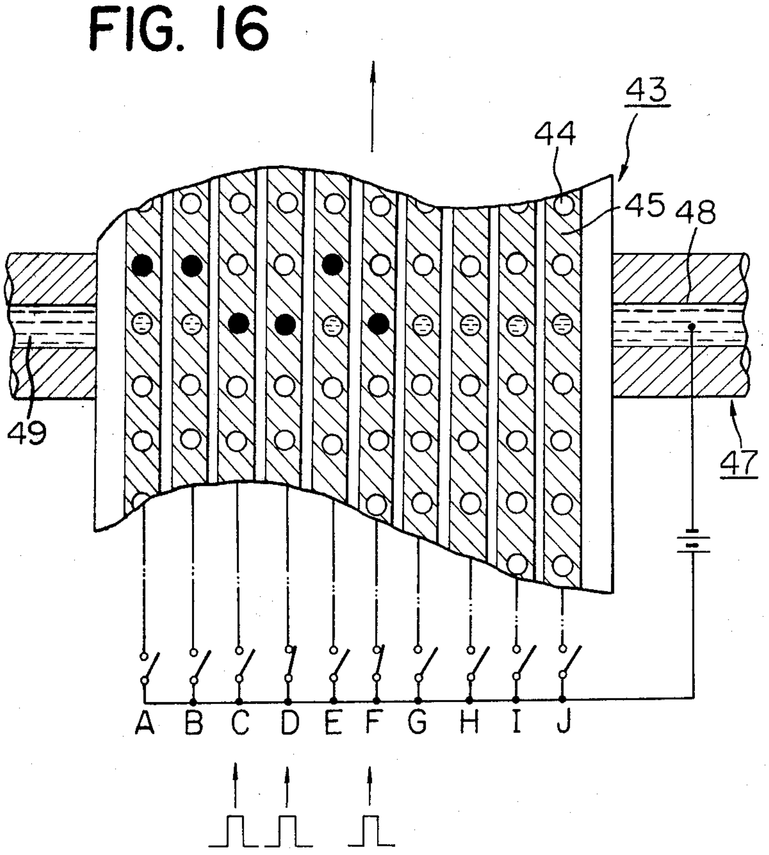
FIG. 16 is a plan view showing the arrangement of an embodiment of the present invention.

In the present embodiment the screen member 43 is displaced in such a manner that the linear electrodes 45 perpendicularly cross the capillary slot 48 so that only a single hole in each linear electrode corresponds to the slot 48. Thus, by applying a pulse voltage to each linear electrode corresponding to the image information, ink 49 is introduced into the through hole positioned corresponding to said capillary slot 48. As the screen member 43 is displaced in the direction of arrow, new holes are successively brought into the position of said capillary slot 48 whereby the ink is introduced into such holes corresponding to the image information. In FIG. 16 the pulse voltage is initially applied to the linear electrodes A, B and E according to the image information whereby strong electric fields are formed only in the through holes in said electrodes located in contact with or in the proximity of the liquid surface in the capillary slot 5 to attract, by the electrostatic force thereof, the ink into said holes. The pulse voltage is next applied to the linear control electrodes C, D and F when the through holes of a next row come in contact with or in the proximity of the capillary slot 5 by the displacement of screen member 1 to achieve similar ink introduction into the corresponding holes. By repeating this procedure there is obtained an image corresponding to the image information on the screen member 1. In FIG. 1ı the black circles represent the through holes thus filled with the ink. It will be understood that, although each linear electrode receives a uniform voltage, the ink introduction takes place only in a hole thereof located in the proximity of or in contact with the capillary slot 5. In this manner said voltage functions as a gate signal for controlling the ink introduction into said hole. In this embodiment, therefore, the image composed of ink filled in the through holes of screen member corresponding to the image information is obtained by applying said gate signals in synchronization with the displacement of said screen member.

In the present embodiment said displacement can be performed either continuously or stepwise. A stepwise displacement allows securer registration of through holes with the capillary ink slot. It will also be understood that said displacement of the screen member is not necessarily limited to the perpendicular direction to the capillary slot. It is also possible to bring plural through holes, instead of one hole, in a linear electrode in register with the capillary ink slot thereby introducing ink simultaneously into plural through holes. Furthermore said ink slot need not necessarily be of a capillary dimension according to the distance between the through holes.

Also in this embodiment the image formed on the screen member according to the image information can be transferred to a printing medium either by the ink flight or by contact transfer as will be explained in the following.

Figure 17:
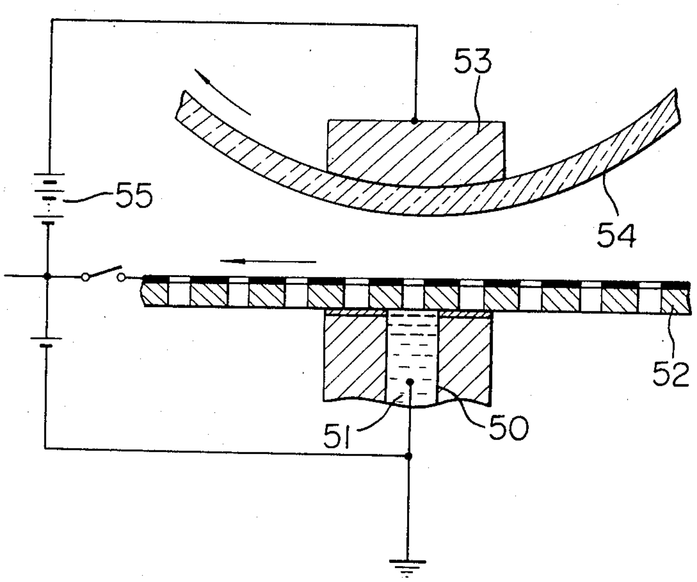
FIGS. 17 and 18 are cross-sectional views showing embodiments of the present invention.

FIG. 17 shows an embodiment of flying the image formed on the screen member to a printing medium by means of a counter electrode, wherein a capillary ink slot 50 maintains liquid ink 51 in the proximity of or in contact with a screen member 52. Behind and parallel to said screen member 52 there is provided a counter electrode 53, and a printing medium 54 is placed therebetween. A voltage source 55 continuously applies a voltage between the grounded liquid ink 51 and the counter electrode 53. In this manner, as already explained in connection with FIG. 14, the ink is sucked into the through holes of screen member 52 corresponding to the image information and is further made to fly to and deposited on the printing medium 54 by the electrostatic force generated by said counter electrode, thus forming an image on said printing medium corresponding to the image information. The voltage supplied to said counter electrode is naturally selected so as to cause the flight of ink already introduced into the through holes but not to cause the flight of ink from the capillary slot 50. The printing medium 54 is displaced in synchronization with the screen member 52.

Figure 18:
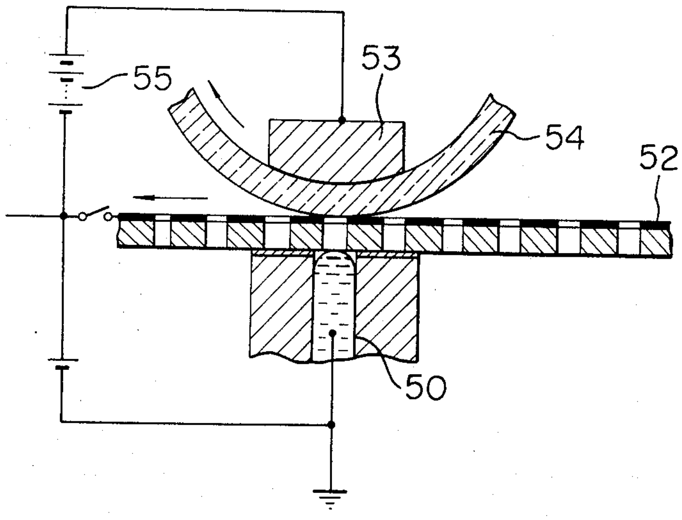

FIG. 18 shows an embodiment of contact transfer of image from the screen member 52 to the printing medium 54. Although in the embodiment shown in FIGS. 5 and 6 the image formed on the screen member is transferred after it is displaced to a transfer position, the ink in the present embodiment introduced into the holes of screen member 52 in the arrangement shown in FIG. 14 is transferred onto a printing medium 54 maintained in contact with the screen member 52 in a position corresponding to the capillary slot 50. Also in this embodiment the printing medium 54 is naturally displaced in synchronization with the screen member 52. In this embodiment, ink introduced into the through holes is almost simultaneously transferred to the printing medium as explained above, but also it is possible, in a similar manner as shown in FIGS. 5 and 6, to displace the screen member holding the ink image thereon from the capillary slot 50 and thereafter bring the printing medium 54 into contact with said screen member 52 thereby performing image transfer onto said printing medium 54. Further, in the present embodiment there may be provided a counter electrode 53 behind the printing medium in the transfer position, for achieving securer transfer of ink drops from the through holes to the printing medium 54 by the electrostatic attractive force from said counter electrode and thus realizing improved reproduction of image on the printing medium 54.

Figure 19:
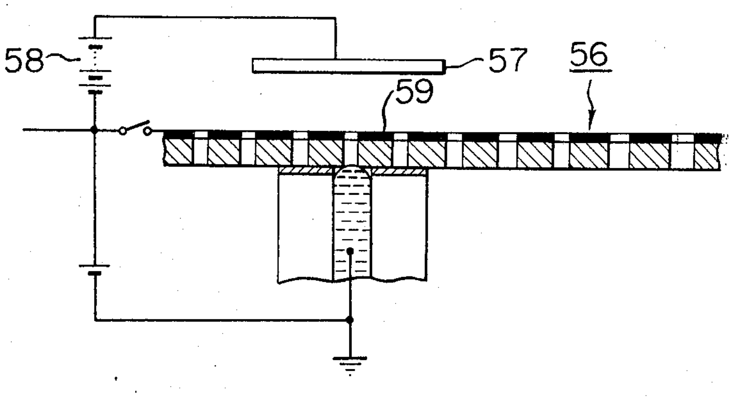
FIG. 19 is a cross-sectinal view showing an another embodiment of the present invention.

Further, also in the present embodiment a low-voltage control of image formation is rendered possible by the use of a counter electrode. In this case, as shown in FIG. 19 behind and parallel to the screen member 56 there is provided a counter electrode 57, and a voltage is continuously applied, by a voltage source 58, between said electrode 58 and the liquid ink, whereby the ink introduction into the through holes is achieved by the cooperation of electrostatic forces of said counter electrode 57 and of the control electrode 59 receiving a voltage corresponding to the image information. This arrangement allows reduction of the voltage applied to the linear electrodes, thus enabling a low-voltage control of image formation. The resulting lower interaction between the neighboring linear electrodes allows said electrodes to be arranged in a higher density, thus easily permitting improvement of the image quality. The voltage supplied to the counter electrode 57 is naturally of a magnitude not causing the ink introduction into the through holes.

Figure 20:
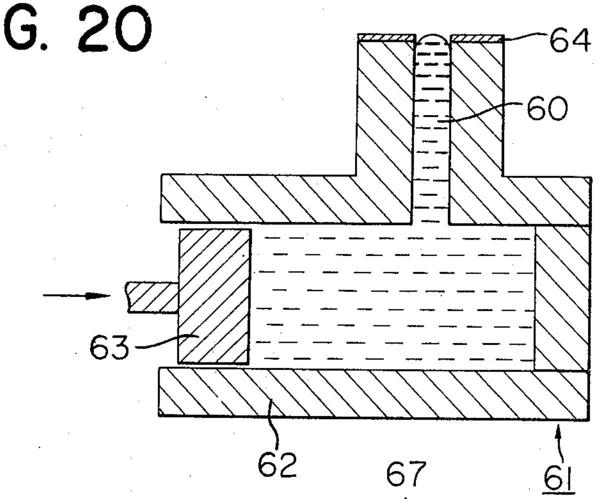
FIGS. 20 and 21 are cross-sectional views of an ink supply device.
Figure 21:
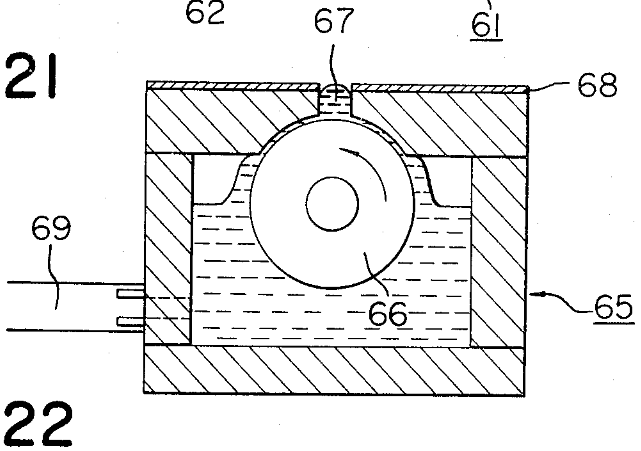

FIGS. 20 and 21 show the examples of ink supply device for supplying ink to the capillary slot. In FIG. 20 there are shown a capillary slot 60, and an ink supply device 61 provided with a cylinder 62 and a piston 63. The liquid ink is pushed into the capillary slot 60 by pressing the piston 63 in the direction of arrow.

In this arrangement the amount of ink supplied into the capillary slot 60 can be made constant by constantly applying a predetermined pressure to said piston.

The ink is prevented from spilling from the capillary slot 60 by the presence of an ink-repellent layer 64 provided on the upper surface of said slot. Also in an example shown in FIG. 21 the ink supply device 65 is internally provided with an ink feed roller 66 which is rotated in the direction of arrow to drive the liquid ink in the ink reservoir 65 into the capillary slot 67, whereby a constant ink supply into the slot 67 can be assured by a constant rotating speed of said roller 66.

68 is an ink-repellent layer while 69 is an ink supply inlet. Also said roller 66 may be provided with a coarse surface or grooves on the periphery thereof to facilitate upward movement of ink. The structures shown in FIGS. 20 and 21 allow the supply of liquid ink into the capillary slot even when the wall thereof is water-repellent, such water-repellent capillary wall being advantageous in assuring release of liquid ink from the capillary wall at the contact transfer or ink flight. Naturally ink supply into the capillary slot by capillary phenomenon is also possible if the slot wall is hydrophilic.

As explained in the foregoing, the present embodiment is featured in that the screen member is displaced in such a manner that the linear electrodes thereof perpendicularly cross the capillary slot of an ink supply device thereby bringing one through hole in each linear electrode in register with said capillary slot, and in that pulse voltages corresponding to the image information are applied to said linear electrodes to cause ink introduction into the through holes thus positioned in register with said capillary slot thereby forming an image on the screen member. The use of linear electrodes in the present embodiment allows an extremely simplified electrode control in comparison with the case of independent electrodes provided respectively corresponding to the through holes and requiring independent control according to the image information signals. Thus the present embodiment reduces the frequency of troubles and also allows reduction of the production cost.

Now FIGS. 22 to 29 show still another embodiment of the present invention wherein there is further provided a deceleration control electrode for controlling the amount of ink to be emitted.

Figure 22:
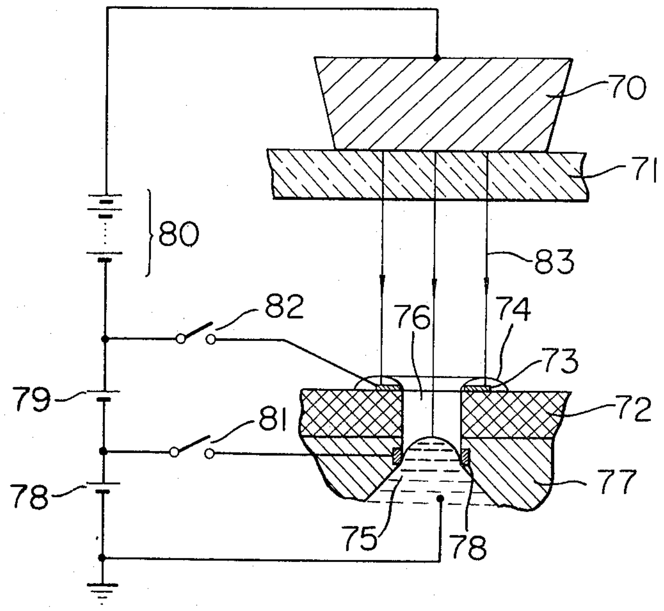
FIG. 22 is a plan view showing the arrangement in the above-mentioned embodiment.
Figure 23:
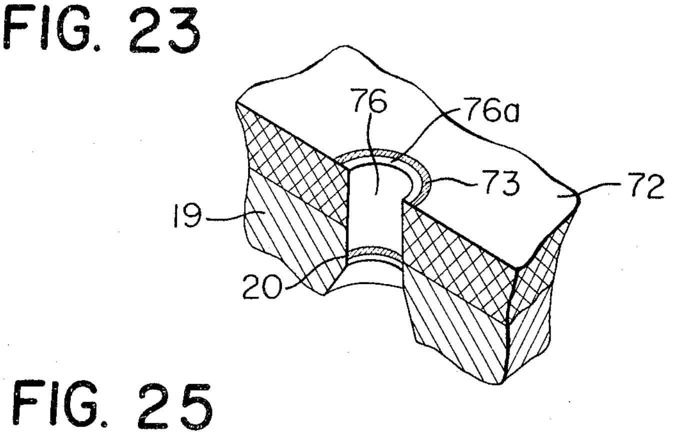
FIG. 23 is a perspective view showing the cross section of a through hole.

FIGS. 22 and 23 show an image forming apparatus of the present invention wherein a deceleration control electrode 78 is provided on the internal surface of a hydrophilic apertured member.

Figure 24:
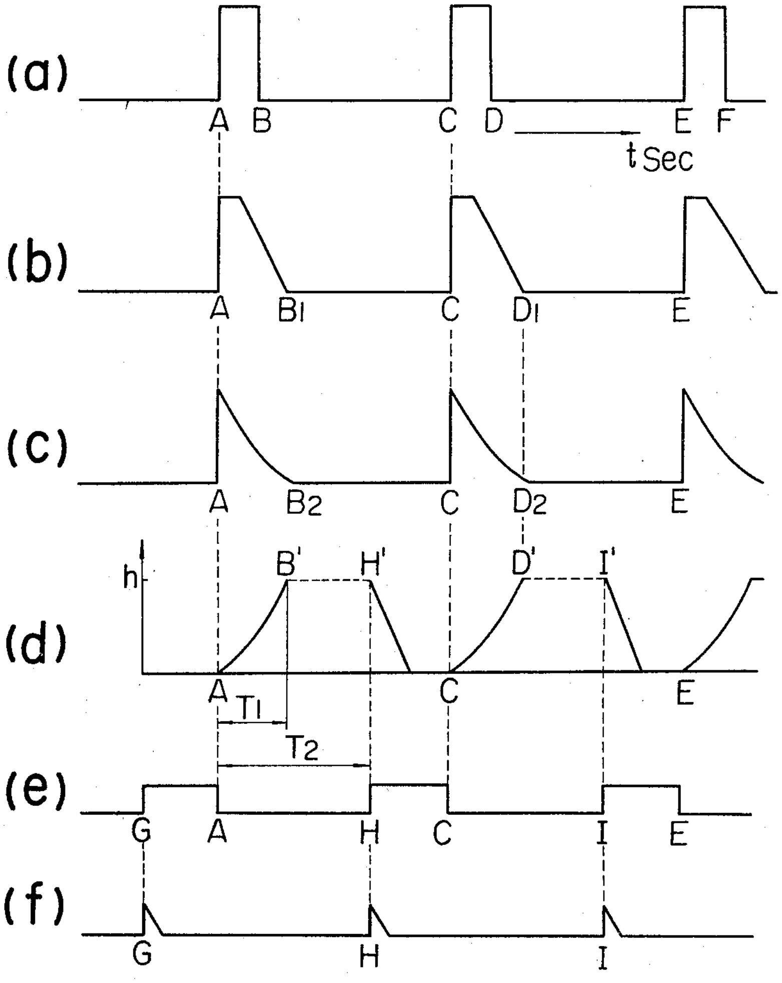
FIG. 24 is a chart showing the relationship between the voltages applied to the control electrode and deceleration control electrode and the ink level in the through hole.

In FIG. 22 there are shown a counter electrode 70 constantly receiving a high voltage, a printing medium 71, a water-repellent insulating apertured member (substrate) 72, a control electrode 73, a water-repellent insulating coating 74, liquid ink 75, an internal surface 76 of a through hole or aperture, a hydrophilic insulating apertured member (substrate) 77 and a deceleration control electrode 78. Also there are provided DC power sources 78, 79 and 80 connected in series, the negative and positive terminals of said source 78 being respectively connected to the liquid ink 75 and to the deceleration control electrode 78 through a switch 81. Also the positive terminal of said source 79 is connected to the control electrode 73 through a switch 82, and the positive terminal of said high-voltage source 80 is connected to the counter electrode 70. In the above-explained arrangement, upon receipt by the control electrode 73 of an input signal voltage for example as shown in FIG. 24 (*a*), (*b*) or (*c*), the resulting circumferential electric field and the electric field 83 of the counter electrode 70 cooperate each other to form an electric field vector acting on the through hole 76 to induce a charge on the liquid ink surface, whereby the Coulomb force thereof causes the ink to rise in the through hole. FIG. 24 (*d*) shows the change in time of the ink level in the hole and represents that the ink level reaches the upper end 76*a* of the hole within a period $T_1=B'-A$.

In case of a wave form as shown in (b) or (c), however, the input signal voltage should be reduced as the ink level approaches the upper end 76*a* and the period of input voltage should be made shorter than the period $T_1$ since the input voltage provides a Coulomb attractive force which is effective for elevating the liquid ink up to the upper end of the through hole 76*a* but functions as a resistance to the ink to be emitted from the upper end of said hole. Therefore it is necessary to extinguish said Coulomb resistance before the liquid ink reaches the upper end 76*a* of the hole.

Figure 25:
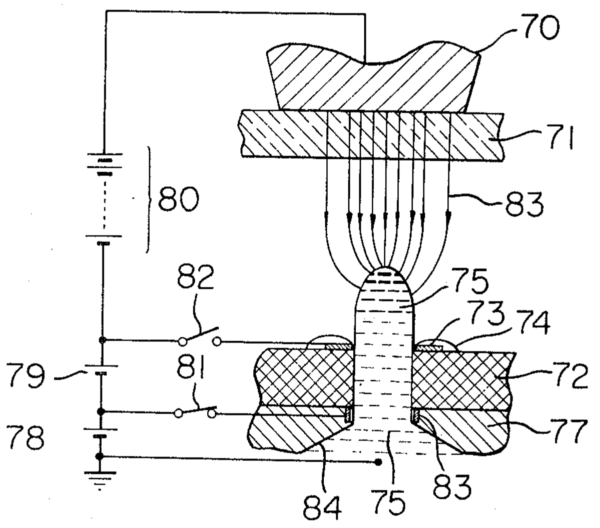
FIG. 25 is a cross-sectional view showing the state of liquid ink rising in the through hole.

If the liquid ink then assumes a protruding shape as shown in FIG. 25, the electric field 83 generated by the counter electrode 70 is concentrated on the protruding portion of liquid ink 75, because the conductive ink, surrounded by the insulating apertured member, is also electromagnetically considered protruding. If said apertured member is composed of a material having a larger conductivity than that of the liquid ink 75, for example of a metal, the above-mentioned electric field is not concentrated on the liquid ink but is dissipated on said metal, merely repeating discharges. In this case, therefore, the electric energy is not converted into mechanical energy. Only when the concentrated electric field E satisfies a condition $E \geqq 2(\alpha/\epsilon_0\epsilon_s R)^{\frac{1}{2}}$ as explained in the foregoing, the ink is emitted from the upper end 76*a* of the hole after a period $T_1$.

Figure 26:
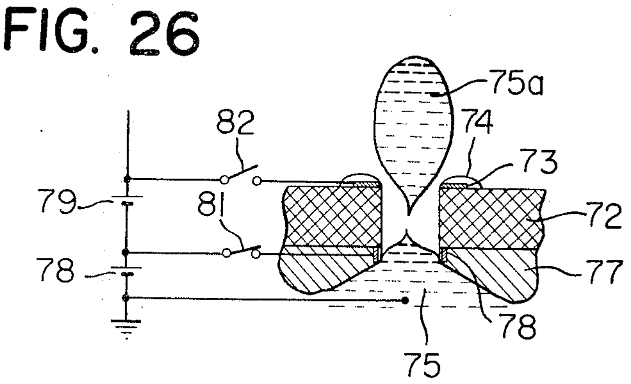
FIG. 26 is a cross-sectional view showing the state at the instant when an ink drop is separated.

The broken line B'H' in FIG. 24(*d*) indicates that the ink is being emitted. By applying a stop signal voltage shown in FIGS. 24 (*e*) or (*f*) to the deceleration control electrode 78 after a period $T_2=H'-A$ from the start of supply of input signal to the control electrode, there is induced a charge 83 of opposite polarity (FIG. 25) on the liquid ink surface at the liquid-solid interface in the vicinity of said deceleration control electrode, thereby generating a Coulomb attractive force at said interface. A sufficiently large attractive force can be obtained with a very low voltage if the insulating coating 84 on the deceleration control electrode is sufficiently thin and the dielectric constant of said coating is also sufficiently high. The electrostatic attractive force perpendicular to the internal wall of the through hole functions as a friction resistance, whereby the liquid ink 75, being prevented from free passage in the vicinity of said deceleration control electrode 78, generates a constriction around the periphery thereof. Said constriction develops instantaneously and, assisted by the surface tension, results in formation of a separate ink drop 75*a* as shown in FIG. 26. In FIG. 24 (*d*) the downward slope to the right of H′ represents such separation of liquid drop. The present embodiment is most suited for use in a multi-orifice apparatus which will be explained in detail in the following.

Figure 27:
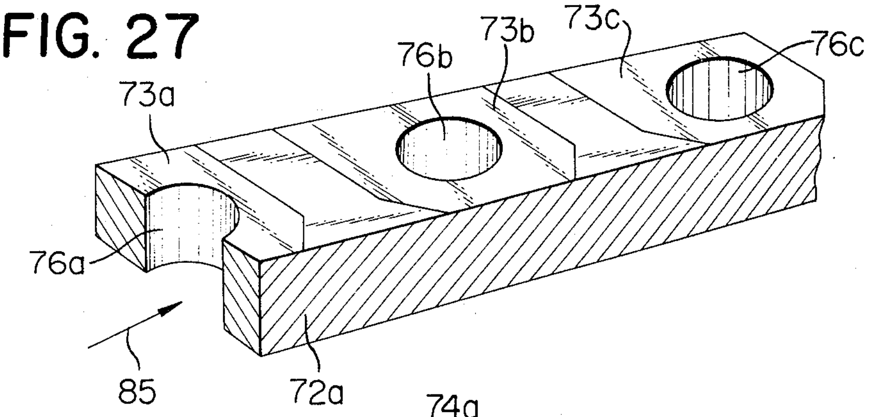
FIG. 27 is a perspective view showing the arrangement of control electrodes.
Figure 28:
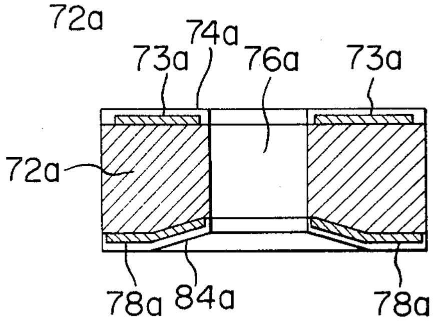
FIG. 28 is a cross-sectional view of a through hole.

Referring to FIGS. 27 and 28, the apertured member 72*a* is composed of a water-repellent insulating material of a thickness of 50–100 microns, preferably of a polyimide film or a tetrafluoroethylene (Teflon) film. Said film is at first subjected, on both surfaces thereof, to the deposition of evaporated conductive layers composed for example of copper or aluminum, and then is subjected to a pattern exposure step followed by an etching step known in the art of integrated circuit manufacture, thereby forming control electrodes 73*a*, 73*b*, 73*c*, . . . on the upper surface as shown in FIG. 27 and deceleration control electrodes 78*a*, . . . on the lower surface as shown in FIG. 28 in a cross-sectional view seen from the direction of arrow 85 in FIG. 27. The through holes 76*a*, 76*b*, 76*c*, . . . can be prepared by known physical or chemical methods such as laser, electron beam, ultrasonic or etching process, or by a special mechanical borer if the diameter is in excess of 50–100 microns. Successively the control electrodes 73*a* and deceleration control electrodes 78*a* are covered with insulating coatings 74*a*, 84*a*, and an ink-repellent layer is provided around the upper orifice of the through holes and in the internal periphery of the through holes. These steps, however, can be simplified by coating both surfaces and internal wall of said through holes with a water-repellent insulating material. For this purpose most suited is Teflon coating. However, the coating for the deceleration control electrodes may be of hydrophilic character if desired.

Figure 29:
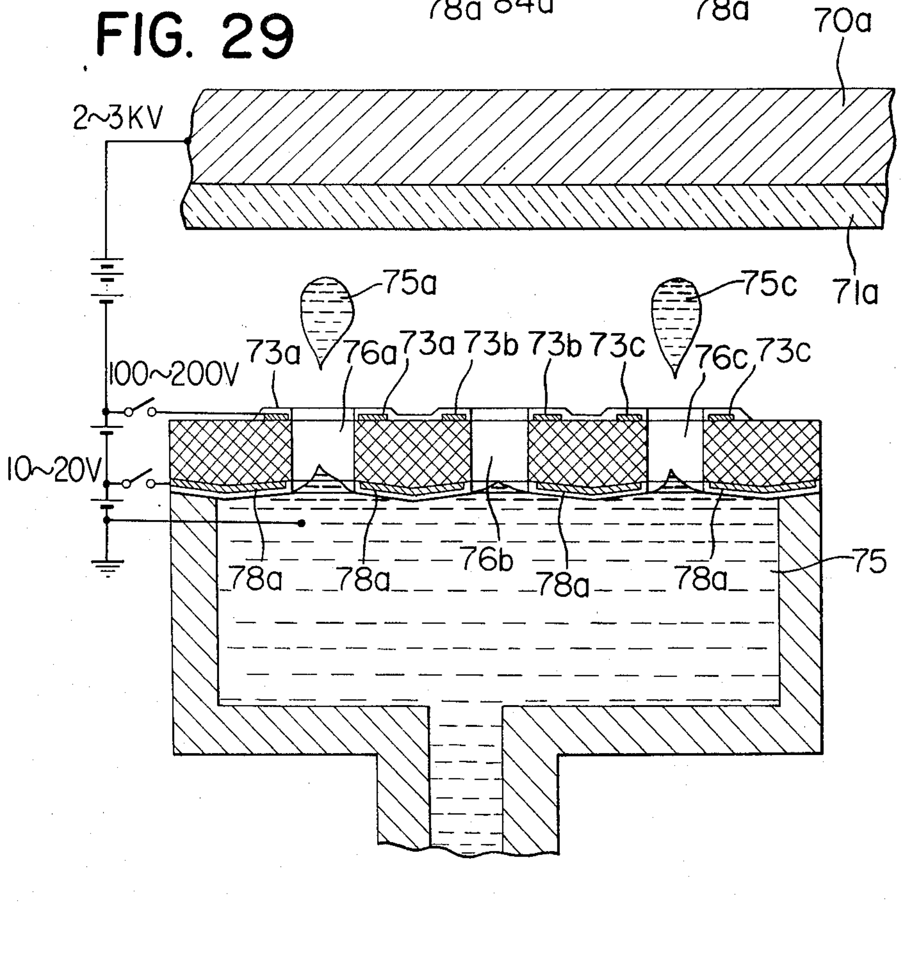
FIG. 29 is a cross-sectional view showing the arrangement of the above-mentioned embodiment.

FIG. 29 shows the image forming apparatus of the present embodiment wherein a voltage of 2–3 kV is constantly applied to the counter electrode 70*a*. The liquid ink drops 75*a*, 75*c* are emitted from the holes 76*a*, 76*c* toward the printing medium 71*a* by applying an input signal voltage of 100–200 V to the corresponding control electrodes 73*a*, 73*c* for a period of 200 microseconds. The flight of remaining ink 75 is prevented by applying a voltage of 10–20 V to the deceleration control electrode 78*a* simultaneously with the cut-off of the input signal voltage supplied to the control electrodes 73*a*, 73*c*. Said deceleration control electrode 78*a*, functioning to interrupt the ink emission, also performs an additional function of liquid level control. The liquid surface facing the holes 76*a*, 76*c* immediately after the ink emission is perturbed and is therefore in a state different from that facing the hole 76*b* not having emitted the ink, but the voltage applied to said deceleration control electrode functions to rapidly quench the above-mentioned perturbation, thereby maintaining the liquid surfaces in different holes at a same level and thus stabilizing the amount of liquid ink to be emitted next time. In this manner the present embodiment permits stable control of the amount of emitted ink and thus realization of an image of improved quality by the use of deceleration control electrodes. The voltage supply to said deceleration control electrodes may be conducted while a voltage is supplied to the control electrodes, and a satisfactory flow rate control is achievable also in this case.

Figure 34:
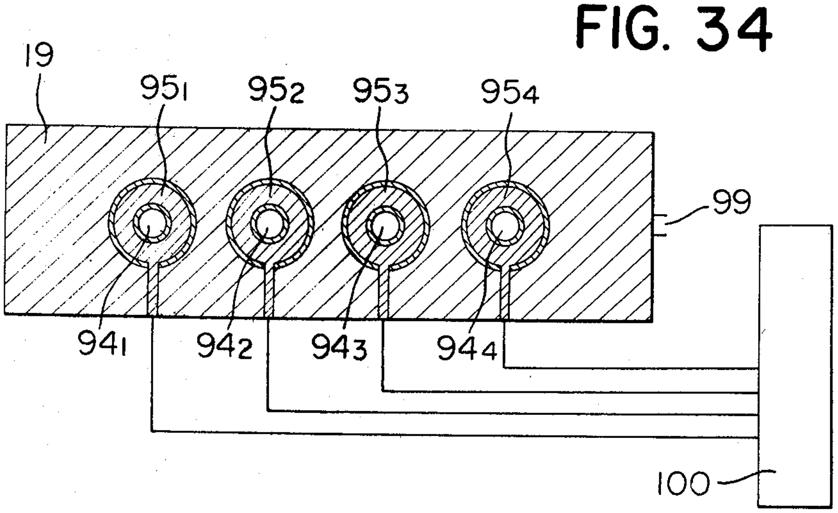
FIG. 34 is a plan view of the apparatus shown in FIG. 33.

Now there will be explained still another embodiment shown in FIGS. 30 and 34, wherein the ink flight is caused by the potential difference formed between the counter electrode and the control electrode as well as that formed between the counter electrode and the liquid ink.

Figure 30:
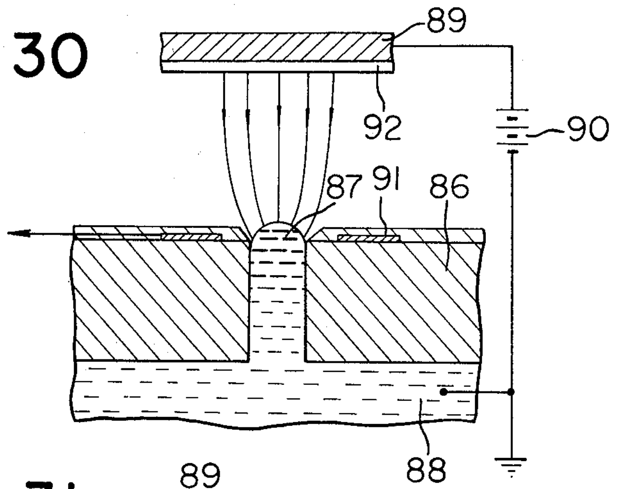
FIGS. 30, 31 and 32 are schematic views showing an another embodiment of the present invention.

Referring to FIG. 30 there is shown in a cross-sectional view, a dielectric plate member 86 formed of a plastic material such as polyimide film, polyethylene film, polyester film etc. and provided with a capillary nozzle 87, said dielectric plate member 86 being inserted into an ink reservoir (not shown) so as to be in contact with the conductive liquid ink 88. Parallel to said plate member 86 there is provided a counter electrode 89, and a power source 90 continuously applies a voltage between the grounded conductive liquid ink 88 and said counter electrode 89 in such a manner that the ink 88 is emitted from the nozzle 87 toward the counter electrode 89. In the present embodiment said nozzle 87 is provided, along the periphery thereof, with a control electrode 91 for receiving a pulse voltage from a power source (not shown), and said pulse voltage supply is controlled by electric signals (not shown) corresponding to the image information thereby selectively controlling the ink flight from the nozzle 87 to form an image on the printing medium 92.

Figure 31:
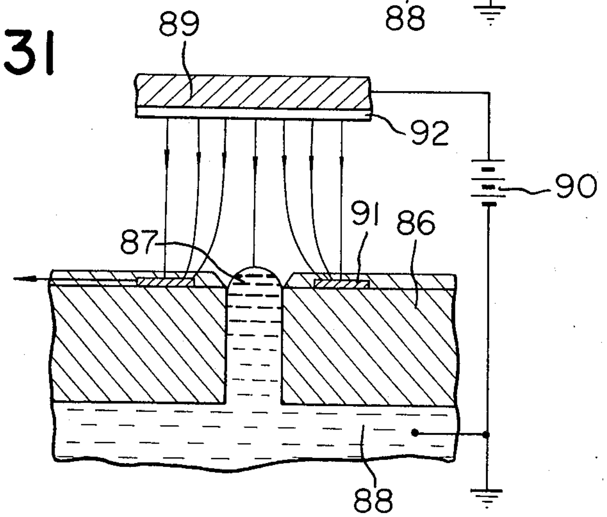

In the present embodiment, as shown in FIG. 31, a voltage is applied to the control electrode 91 of a nozzle of which ink emission is to be suppressed, said voltage application being conducted in such a manner that the potential difference between the counter electrode and the control electrode becomes larger than the potential difference between said counter electrode and the conductive ink maintained in contact with said nozzle. In case the potential of counter electrode is higher than that of control electrode, by applying a potential to said control electrode lower than that of the ink, the lines of electric force generated from the counter electrode 89 are attracted to the control electrode 91 as shown by the arrows in FIG. 31 thereby forming a divergent electric field in the vicinity of the protruding ink portion. Consequently the electrostatic force effecting said ink is weakened to hinder the ink flight. In the present embodiment, therefore, the ink emission takes place only from the nozzles of which control electrodes do not receive the voltage supply. The control electrodes need not necessarily be located between the through holes and the counter electrode but may be provided in contact with the nozzles since the ink flight can be securely prevented by diverging the electric field of the counter electrode by means of control electrodes.

The introduction of ink into the nozzles is achievable by capillary phenomenon, but in the present embodiment formation of convex meniscus slightly protruding from the nozzle orifices can be achieved by applying a suitable static pressure to the ink contained in the ink reservoir.

Figure 32:
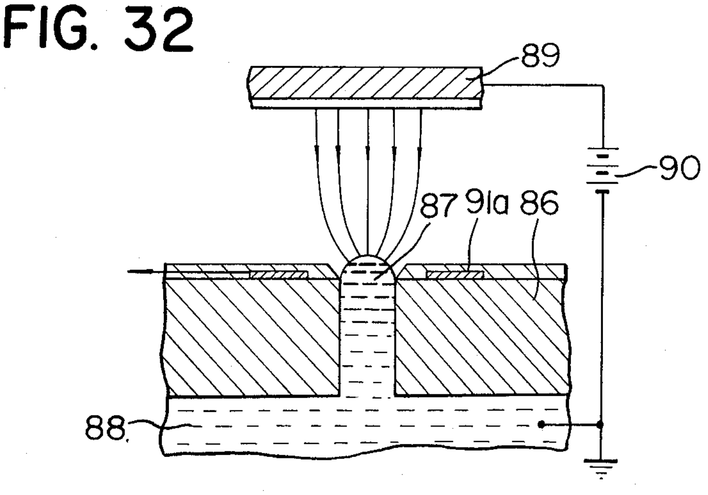

Further according to the present embodiment it is also possible to apply a voltage to the control electrode 91*a* of a nozzle which should emit ink in such a manner that the potential difference between the counter electrode and the control electrode becomes smaller than the potential difference between said counter electrode and the conductive ink maintained in contact with said nozzle, as shown in FIG. 32. Upon supply to the control electrode 91*a* of a pulse voltage of a potential higher than the ink potential, the electric field becomes concentrated on the protruding ink portion to enhance the response of ink emission and to achieve securer ink emission. Thus it is also possible to cause the ink flight by applying a pulse voltage of a potential higher than that of ink to the control electrode 91*a* while maintaining the voltage of counter electrode at a reduced potential insufficient for causing the ink flight. Also in case the potential of counter electrode is lower than that of ink, a similar effect can be obtained by applying, to the control electrode, a potential lower than that of ink.

Figure 33:
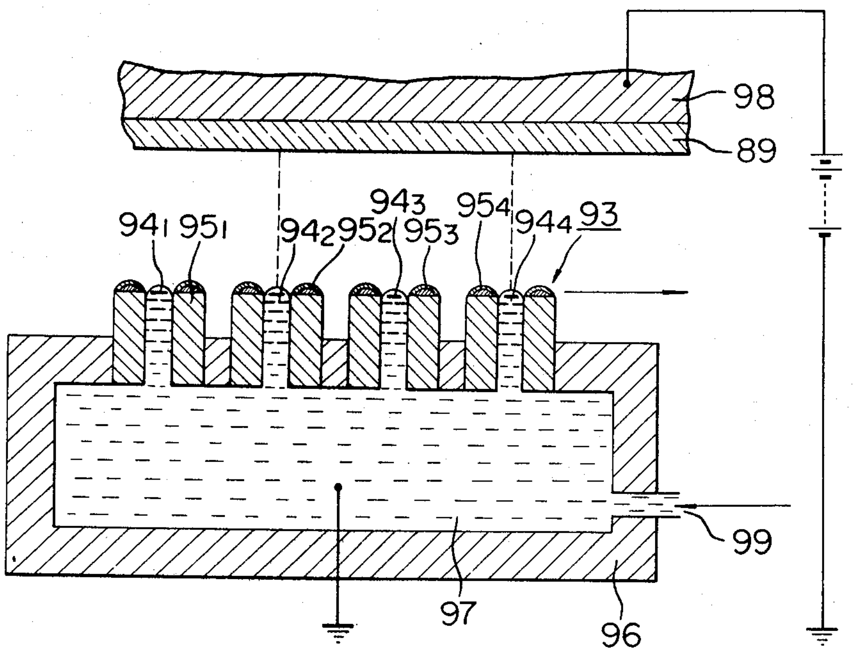
FIG. 33 is a cross-sectional view of an apparatus embodying the present invention.

FIG. 33 shows an example of image formation by a thin film 93 provided with plural nozzles, said film being preferably composed of a water-repellent insulating plastic material such as polyimide film, polyethylene film, polyester film etc. Said nozzles may be supported independently instead of being supported by said film. The nozzles 94$_1$, 94$_2$, 94$_3$ and 94$_4$ are respectively provided on the periphery thereof with control electrodes 95$_1$, 95$_2$, 95$_3$ and 95$_4$. The above-mentioned thin film 93 is maintained in contact with conductive liquid ink 97 contained in an ink reservoir 96 to which a suitable static pressure is applied, whereby the ink 97 is introduced into the nozzles and forms a convex meniscus slightly protruding from each nozzle. The nozzle orifices are maintained at a distance of 1–5 mm from the printing medium 98, and an image corresponds to the image information signals is formed thereon for example by continuously applying a voltage of 1–5 kV to the counter electrode 98 and also applying a pulse voltage of a potential of $-30\sim-200$ V lower than the ink potential to the control electrodes 95$_1$ and 95$_3$ of the nozzles 94$_1$ and 94$_3$ of which ink emission should be suppressed according to the image information, whereby the ink emission takes place only from the nozzles 94$_2$ and 94$_4$. Also it is possible, as shown in FIG. 31, to apply a pulse voltage of a potential of 30–300 V higher than the ink potential to the control electrodes 95$_2$ and 95$_4$ of the nozzles from which ink emission should be made, thereby improving the response of ink flight and realizing securer ink flight. Otherwise ink emission can also be caused by maintaining the counter electrode 98 at a potential insufficient for alone causing the ink emission and applying a pulse voltage of a potential higher than the ink potential to the control electrodes 95$_2$ and 94$_4$.

The ink reservoir 96 is provided with an ink inlet 99 for constantly storing a determined quantity of ink. FIG. 34 shows the thin film in a plan view, wherein 100 is a signal source for supplying signals to the control electrodes according to the image information.

Figure 35:
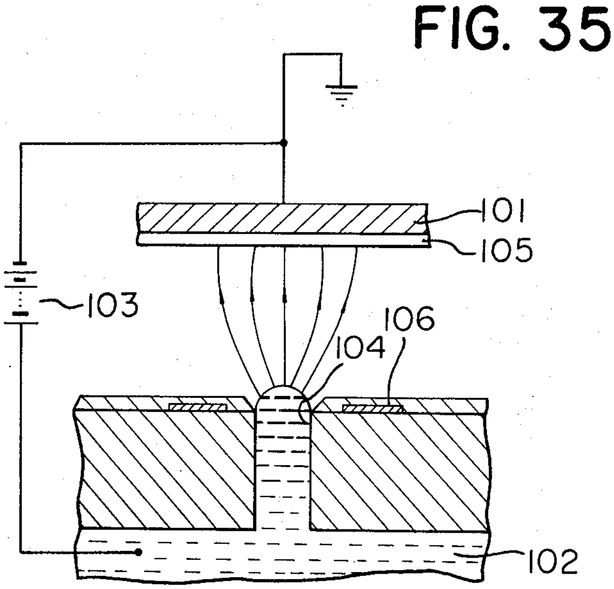
FIGS. 35 and 36 are schematic views showing an another embodiment of the present invention.
Figure 36:
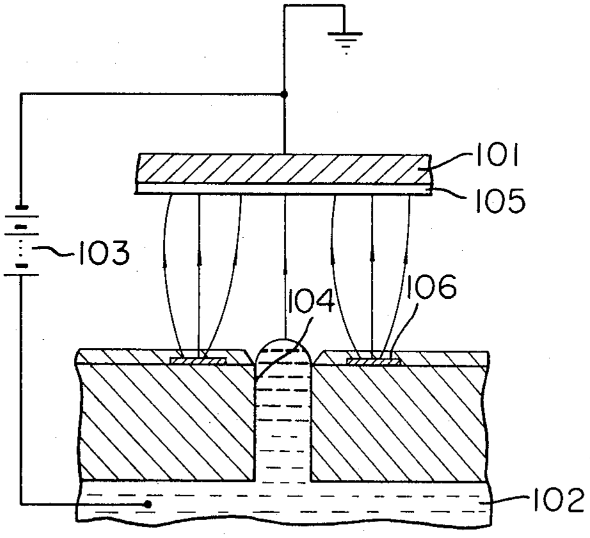

FIGS. 35 and 36 show still another embodiment of the present invention wherein a voltage is continuously applied between a grounded counter electrode 101 and liquid ink 102 contained in an ink reservoir (not shown) by means of a voltage source 103 thereby causing the flight of ink 102 from the nozzle 104 to a printing medium 105. In this case the lines of electric force are directed as shown in FIG. 35.

In case the counter electrode 101 is of a potential lower than that of ink 102, a voltage of a potential higher than the ink potential is supplied according to the image information to the control electrode 106 provided around the nozzle 104, whereby a divergent electric field is formed in the vicinity of the protruding ink portion as shown in FIG. 36 to prevent ink emission as the electrostatic force effecting the protruding ink portion is weak in this case.

In case the counter electrode 101 is of a potential higher than that of ink 102, the ink emission can be suppressed by supplying, according to the image information, a voltage of potential lower than that of ink 102 to the control electrode 106. Stated differently, also in the present embodiment, the ink emission from the nozzles can be suppressed by rendering the potential difference between the counter electrode and control electrode larger than the potential difference between the counter electrode and the conductive liquid ink maintained in contact with the nozzles.

Furthermore it is naturally possible to obtain ink emission in a similar manner as shown in FIG. 32 by reducing the potential difference between the counter electrode 101 and the ink 102 to a magnitude insufficient for alone causing the ink emission and applying an opposite bias potential to the control electrode. The ink usable in the present embodiment is a conductive ink or an oily ink of a relatively high resistance since the counter electrode is grounded. In case of using conductive ink, the ink reservoir is preferably made of an insulating material. The internal wall of nozzle may be water-repellent or hydrophilic as long as it is insulating. However for effective utilization of electric field the ink at the nozzle orifice is preferably formed in a convex meniscus which is advantageously achievable by water-repellent surface provided at the nozzle orifice.

As explained in the foregoing, the present embodiment is featured in forming an image by applying a voltage according to the image information, to the control electrodes of the nozzles of which ink emission is to be suppressed, of a magnitude sufficient for generating a divergent electric field in the vicinity of said nozzles thereby suppressing the ink emission from said nozzles and causing the ink emission solely from the nozzles of which control electrodes do not receive said voltage. For this reason the control electrode need not necessarily be positioned between the nozzle and the counter electrode but may be provided on the upper surface of nozzle or in the vicinity of said upper surface inside the nozzle itself. It is therefore rendered possible to dispense with cumbersome alignment between the nozzles and control electrodes and thus to significantly simplify the structure of apparatus. Also in the present embodiment the flight path of ink does not contain any auxiliary electrode that may hinder the ink flight and deteriorate the image.

Figure 38:
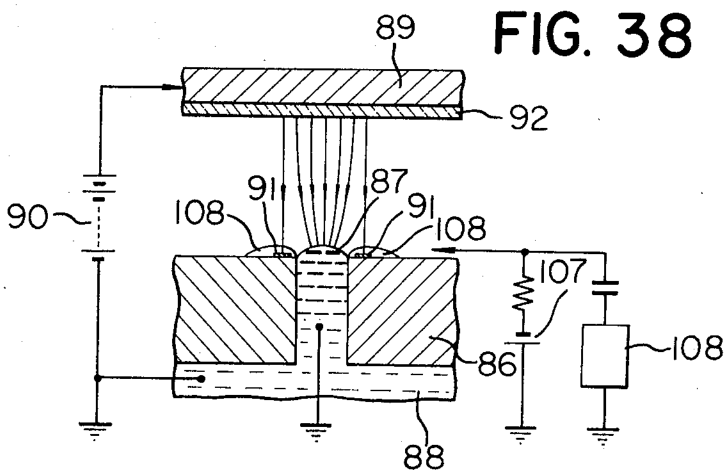
Figure 39:
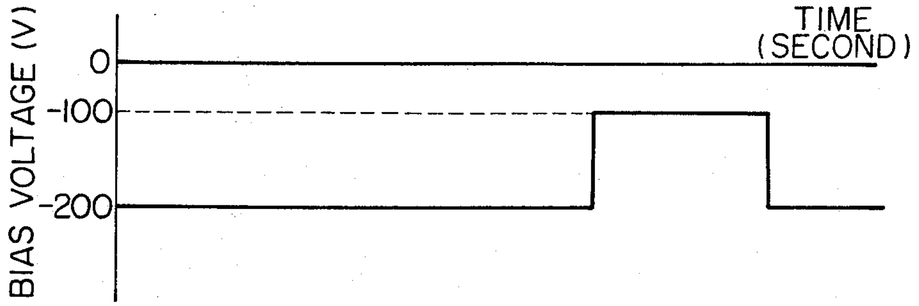
FIG. 39 is a chart showing the relationship between bias voltage and time.

Now a further improvement over the preceding embodiment will be explained in the following with reference to FIGS. 37 to 39. FIGS. 37 and 38 show, in a cross-sectional view, a dielectric plate member for use in the present embodiment, wherein the same components as in the preceding embodiment are represented by the same numbers. In the present embodiment the conductive liquid ink 88 is grounded while the counter electrode is continuously supplied with a voltage of 2.6–3.0 kV from a voltage source 90. Simultaneously a control electrode 91, provided around a nozzle 87, is continuously supplied with a bias voltage of $-200$ V by a voltage source 107. 108 represents an ink-repellent layer. In such arrangement the potential difference between the counter electrode 89 and control electrode 91 is larger than the potential difference betwen said counter electrode and conductive liquid ink 88 maintained in contact with said nozzle 87 to prevent ink emission therefrom. The state of lines of electric force is shown in FIG. 37.

In this state the lines of electric force emerging from the counter electrode 89 are attracted by the control electrode 91 as shown by the arrows in FIG. 37 to form a divergent field in the vicinity of protruding ink portion, whereby the ink emission is prevented as the electrostatic force acting on the protruding ink portion is weakened. In the present embodiment a pulse generator 108 applies a pulse voltages of 30–200 V for a period of 100–200 microseconds to the control electrodes of the nozzles from which ink emission should be made according to the image information, thereby selectively controlling the ink emission from the nozzles 87 and thus forming an image corresponding to the image information on the printing medium 92. In the present embodiment the distance between the ink 88 and the counter electrode is maintained at an order of 0.5 mm, and the state of lines of electric force is represented in FIG. 38, Also FIG. 39 shows the change in time of the bias voltage, representing a case of a positive pulse of 100 V applied for a duration of 100 microseconds for causing the ink emission.

As explained in the foregoing the present embodiment is featured in being free from the effect of ink stain on the control electrodes or of changes in physical properties of ink as the control electrodes continuously receive a constant bias voltage. In the present embodiment the counter electrode may receive a voltage in a range of 1–5 kV.

In the present embodiment it is also possible to apply a voltage between the ink and counter electrode in such a manner that the ink assumes a higher potential than that of said counter electrode, to apply in advance a bias voltage to the control electrode of a potential higher than that of ink, and to superpose on said control electrode, a voltage of a polarity same as that of the voltage applied to the counter electrode.

Figure 40:
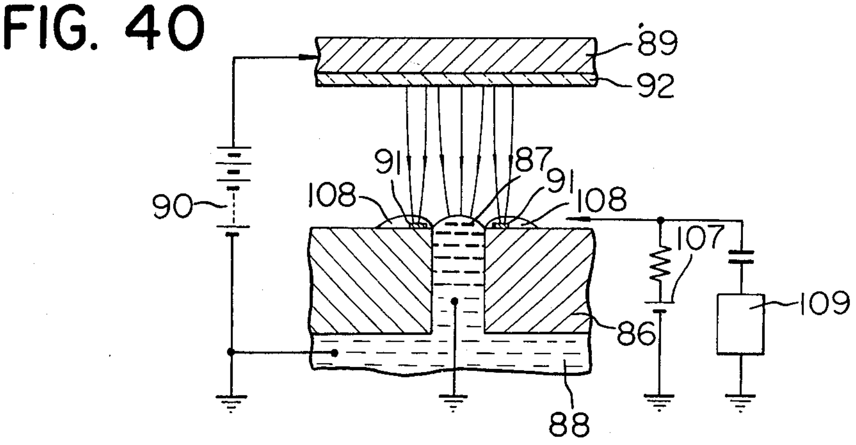
FIGS. 40 and 41 are schematic views showing an another embodiment of the present invention.
Figure 41:
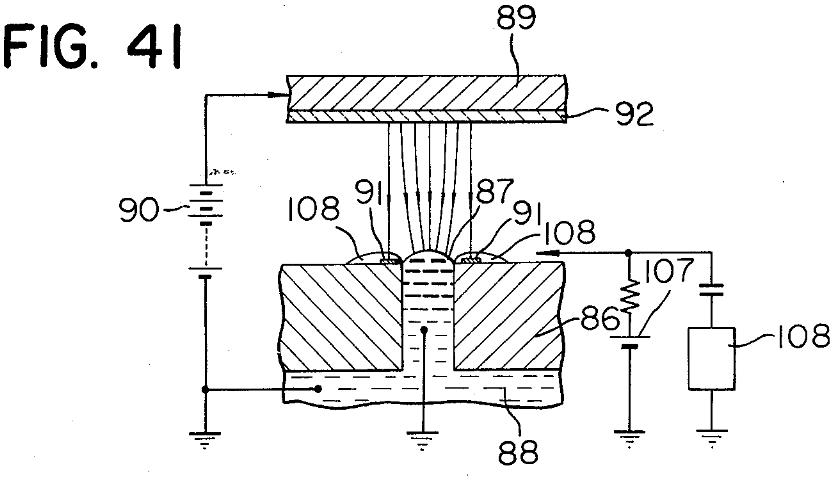
Figure 42:
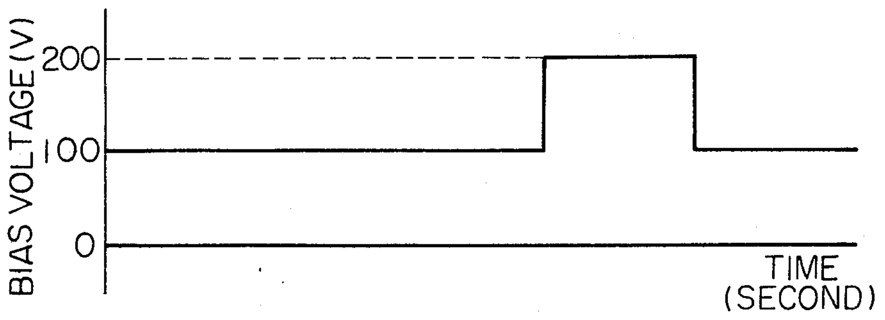
FIG. 42 is a chart showing the relationship between bias voltage and time.

FIGS. 40, 41 and 42 show still another embodiment of the present invention which is featured in further enhancing the ink flight from nozzles provided in a dielectric plate member similar to that employed in the preceding embodiment.

In the present embodiment the conductive liquid ink 88 is grounded while the counter electrode 89 continuously receives a voltage of 2.4 kV from a voltage source 90. Simultaneously the control electrode 91 provided around the nozzle 87 continuously receives a bias voltage of 100 V from a voltage source 107. These applied voltages generate an electric field as shown in FIG. 40, which however is insufficient for causing the ink emission from the nozzle 87. In the present embodiment a pulse generator 108 applies, according to the image information, a pulse voltage of 30–200 V for a duration of 100–200 microseconds to the control electrodes of the nozzles from which the ink emission should be made. Such nozzles are subjected to the lines of electric force as shown in FIG. 41 to cause ink emission therefrom. Thus the ink emission from the nozzles is selectively controlled by controlling the pulse voltages according to the image information thereby forming an image on the printing medium 92 corresponding to said information. The present embodiment is featured not only by the advantages associated with the preceding embodiment but also by a fact that the flying force of ink drops is further enhanced thereby further improving the response of ink emission and achieving securer ink emission. FIG. 42 shows the change in time of bias voltage which is in this case of a positive pulse of 100 V applied for 100 microseconds to cause the ink emission.

Also in this embodiment it is possible to apply a voltage between the ink and counter electrode so as that the ink assumes a potential higher than that of counter electrode, to apply in advance a bias voltage to the control electrode of a potential equal to or lower than that of ink and to superpose a voltage, an said control electrode, of the same polarity as that of the voltage supplied to the counter electrode.

As detailedly explained in the foregoing, the present embodiment is featured not only by the advantages associated with the aforementioned embodiment shown in FIGS. 30 to 36 but also in allowing stable control of image formation without the influence of ink stain on the control electrodes or of changes in physical properties of ink by continuously applying, in advance, a bias voltage to the control electrodes.

The ink to be employed in the aforementioned embodiments of the present invention is required to be electroconductive, but the conductivity is not critically limited but can be modified within a wide range.

Also the control electrode is not limited to a form surrounding the orifice of through hole but may also be composed of plural electrodes provided with suitable distances therebetween and in the vicinity of the orifice. Also it is not limited to a position in contact with the upper surface of apertured member but may also be provided within the through hole in a region thereof close to the upper surface. The water-repellent insulating coating provided on the surface of control electrode allows significant reduction of erosion of the electrode and deterioration of electrode function resulting from ink deposition, thereby remarkably extending the service life of the control electrode. Also the present invention allows elimination the cumbersome aligning operation between the nozzles or through holes and the pin electrodes, thereby contributing to improvements of the precision of the image. Also in the present invention the use of electroconductive ink reduces the resistance in the circuit and improves the pulse response, thereby improving the image quality and enabling faster image formation. Furthermore, conversion to pulse voltages can be achieved easily with a simpler, smaller and less expensive device as the image is obtained by providing each through hole with a control electrode and controlling a low bias voltage to be supplied to said control electrode according to the image information. Said low-voltage control further reduces the mutual interaction between the control electrodes whereby the through holes can be arranged in a higher density to improve the image quality. Furthermore, in case of forming an image by applying a continuous voltage to the counter electrode and by controlling the voltage to be applied to the control electrode according to the image information, said control can be achieved with a low voltage. For this reason it is rendered possible to use high-speed pulses thereby significantly improving the response of image formation. In contrast to a high-voltage control wherein the electrodes cannot be arranged in a high density as the electrical interaction between the neighboring electrodes may deteriorate the image quality, the control with low-voltage pulses according to the present invention allows an image of high resolution to be obtained by arranging the through holes, respectively provided with control electrodes, in a high density. Furthermore the use of low-voltage pulses allows the use of small transistors and integrated circuits thereby enabling production of a compact apparatus.

What we claim is:

1. An image forming process comprising:

providing a screen member having plural through holes and provided with control electrodes in the vicinity of the respective through holes;

providing a counter electrode opposite said screen member;

maintaining the screen member in contact with conductive liquid ink;

applying a predetermined voltage between the liquid ink and the counter electrode; and applying a voltage to the control electrodes in accordance with information signals to introduce the conductive liquid selectively into said holes thereby forming an image on said screen member.

2. A process according to claim 1, including arranging said electrodes in rows and controlling each row independently.

3. A process according to claim 1, including providing said screen member with an ink-repellant layer at the face thereof contacting the ink.

4. A process according to claim 1, wherein said through holes are capillary holes.

5. A process according to claim 1, including bringing said image formed on the screen member into contact with a recording medium to transfer said image to said medium.

6. A process according to claim 1, including forming said screen member of a plastic material selected from the group consisting of polyamid, polyester or polyethylene.

7. A process according to claim 3, including forming said ink-repellant layer of tetrafluoroethylene.

* * * * *

UNITED STATES PATENT AND TRADEMARK OFFICE

CERTIFICATE OF CORRECTION

PATENT NO. : 4,263,601

DATED : April 21, 1981

INVENTOR(S) : YUKUO NISHIMURA, ET AL.

It is certified that error appears in the above—identified patent and that said Letters Patent is hereby corrected as shown below:

Column 1, line 59, delete "allowing".

Column 2, line 18, before "control", insert --the--; line 36, "SECTINAL" should be --SECTIONAL--; line 50, "SECTINAL" should be --SECTIONAL--.

Column 5, line 16 "it" should be --is--; line 29, "herein" should be --therein--; line 57, delete "a".

Column 8, line 41, "A" should be --Å--.

Column 9, line 1, delete "a"; line 49, "1 " should be --16--.

UNITED STATES PATENT AND TRADEMARK OFFICE
CERTIFICATE OF CORRECTION

PATENT NO. : 4,263,601

DATED : April 21, 1981

INVENTOR(S) : YUKUO NISHIMURA, ET AL.

It is certified that error appears in the above—identified patent and that said Letters Patent is hereby corrected as shown below:

Column 10, line 43, "corresonding" should be --corresponding--.

Column 14, line 8, "and" should be --to--.

Column 15, line 31, "corresponds" should be --corresponding--.

Column 18, line 37, after "elimination" insert "of".

Signed and Sealed this

*Twentieth* Day of *October 1981*

[SEAL]

*Attest:*

GERALD J. MOSSINGHOFF

*Attesting Officer* *Commissioner of Patents and Trademarks*